United States Patent [19]

Splitt et al.

[11] 4,179,170

[45] Dec. 18, 1979

[54] CONNECTOR ASSEMBLY FOR TELEPHONE DISTRIBUTION EQUIPMENT

[75] Inventors: Frank G. Splitt, Mt. Prospect; Casimir Cwirzen, Arlington Heights; William W. Hines, Arlington Heights; Arnold M. Ladd, Arlington Heights, all of Ill.

[73] Assignee: Cook Electric Company, Morton Grove, Ill.

[21] Appl. No.: 885,624

[22] Filed: Mar. 13, 1978

[51] Int. Cl.$^2$ .............................................. H01R 3/06
[52] U.S. Cl. ................................... 339/14 R; 337/32; 339/65; 339/198 R; 339/276 A
[58] Field of Search ................. 337/32; 339/18 R, 65, 339/14 R, 22 B, 99 R, 150 B, 198 R, 276 A

[56] References Cited

U.S. PATENT DOCUMENTS

| | | | |
|---|---|---|---|
| 3,936,133 | 2/1976 | Splitt et al. | 339/18 R X |
| 3,947,732 | 3/1976 | Cwirzen | 339/99 R X |
| 4,012,096 | 3/1977 | DeLuca et al. | 339/18 R |
| 4,037,910 | 7/1977 | Paluch | 339/18 R X |
| 4,053,719 | 10/1977 | Debortoli et al. | 339/18 R X |
| 4,086,648 | 4/1978 | Hines et al. | 337/32 X |

Primary Examiner—Neil Abrams
Assistant Examiner—DeWalden W. Jones
Attorney, Agent, or Firm—Mason, Kolehmainen, Rathburn & Wyss

[57] ABSTRACT

A connector assembly designed to be mounted on a telephone main distribution frame includes a connector base having a plurality of rows of channels formed on one face by ledges extending between elongated edges of the connector base, a ground plate having a conductive side and an insulating side and a plurality of pedestals. A first set of terminals extends through the pedestals, the ground plate and the connector base into the channels, and a second set of terminals extends through the pedestals, the ground plate and the connector base so as to project from the ledges such that the first and second sets of terminals maintain the connector base, ground plate and pedestals together. A set of ground receptacles extends from the insulating side of the ground plate and is coupled to the conductive side of the ground plate and with receptacle portions of the terminals in the first and second sets of terminals forms rows and columns of socket groups in the pedestals into which plug-in type protector module may be inserted. Along one of the elongated edges of the connector base is disposed a fanning strip through which incoming and central office telephone lines are extended for connection to the pin portions of the terminals projecting into the channels and from the ledges and is disposed a mounting bracket which groups the incoming telephone lines by having them maintained in channels in the mounting bracket by clip devices and which mounts the connector assembly to the distribution frame such that it can be rotated for easy access of the pin portions of the terminals. Covers also may be provided for the channels and for the pins extending from the ledges. In addition, along the other edge of the connector base, an identification plate or a test field assembly may be mounted.

45 Claims, 22 Drawing Figures

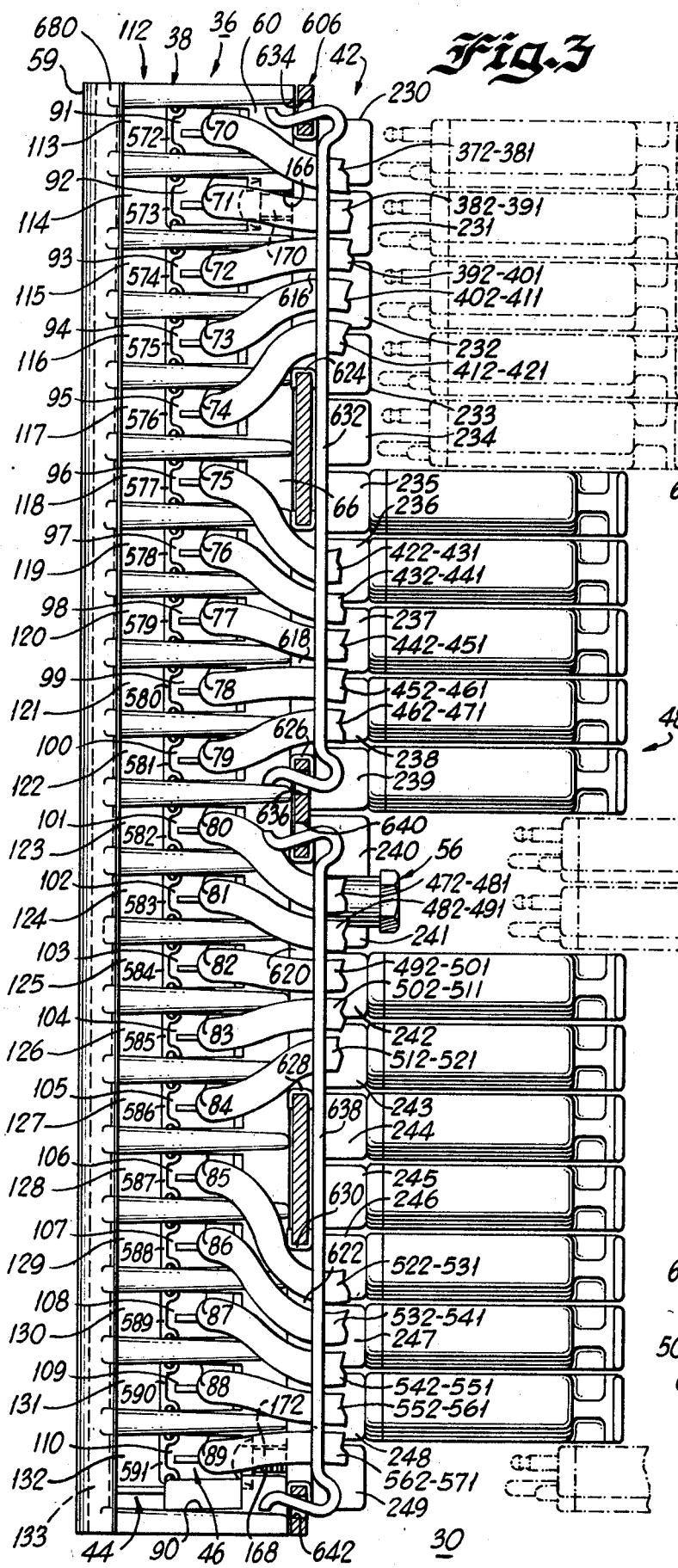
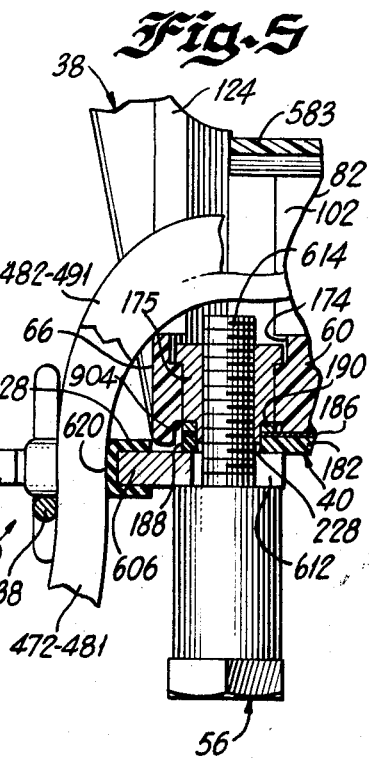
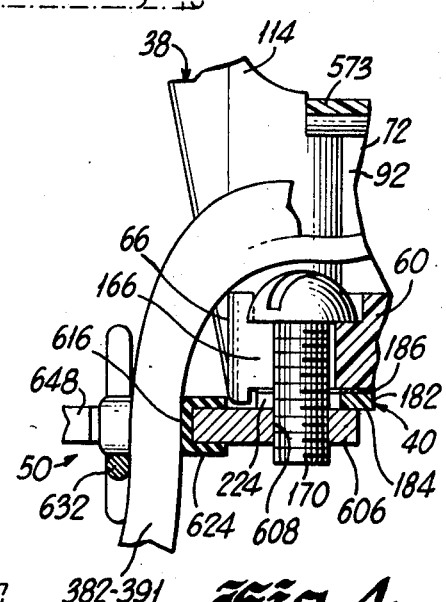

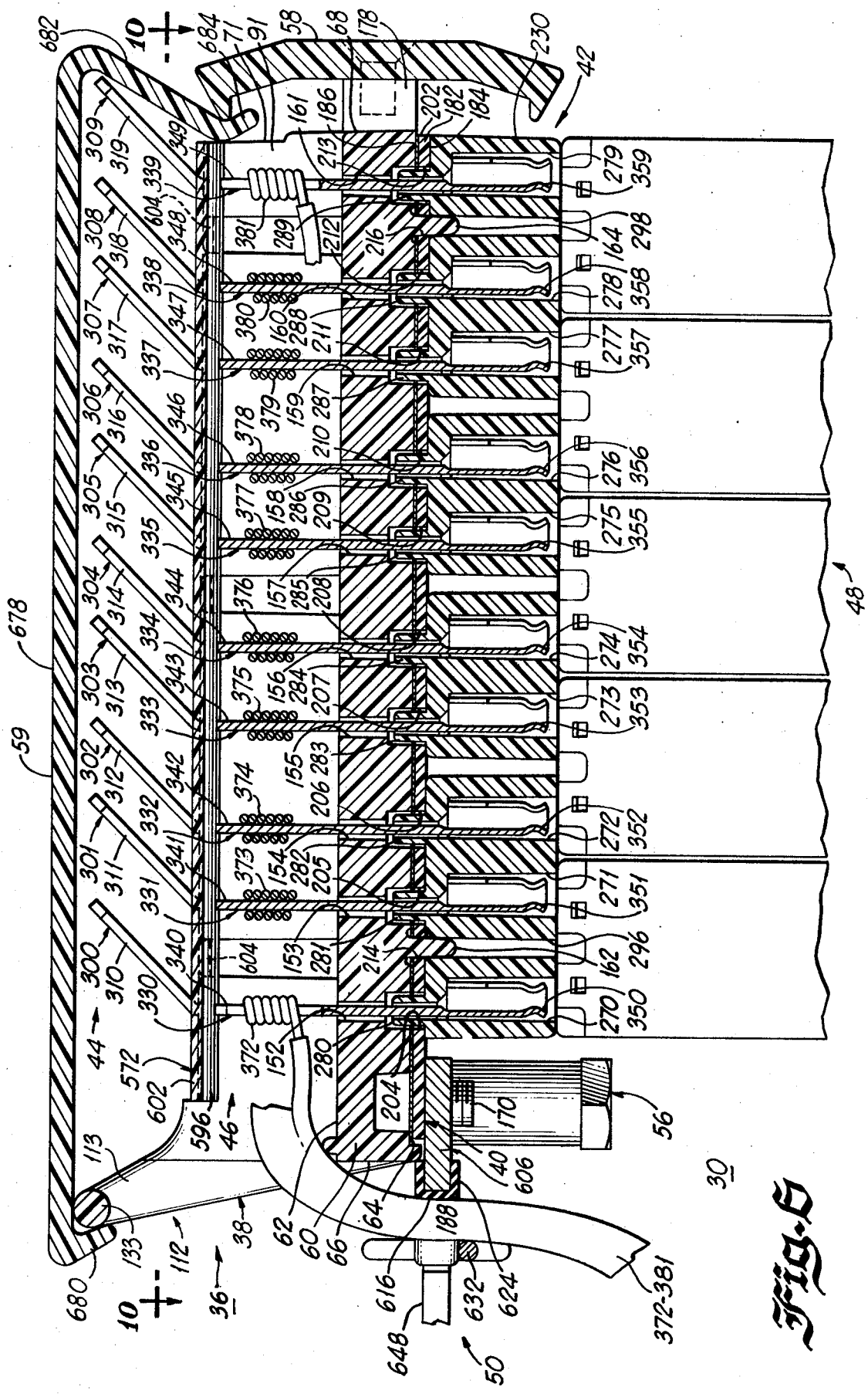

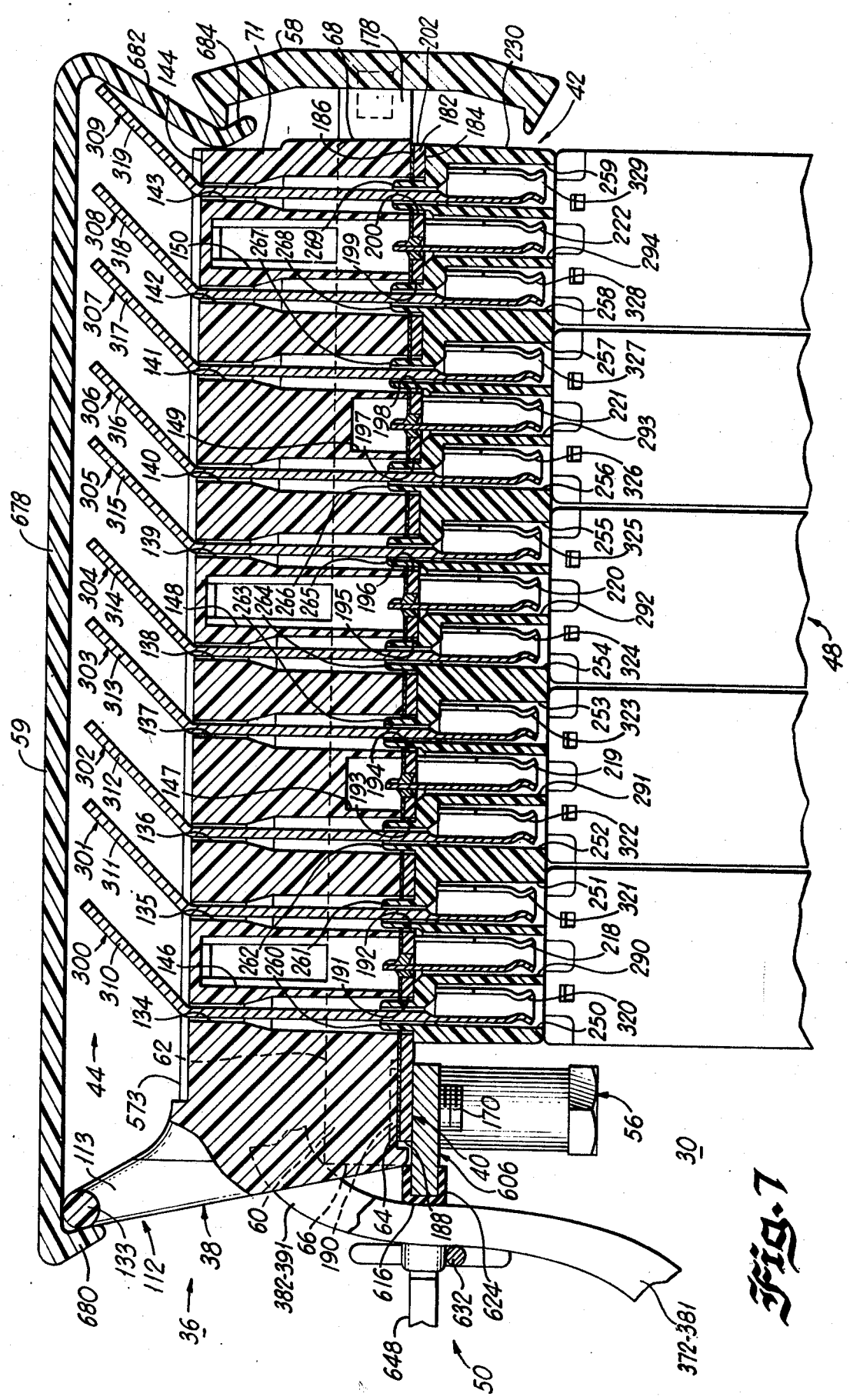

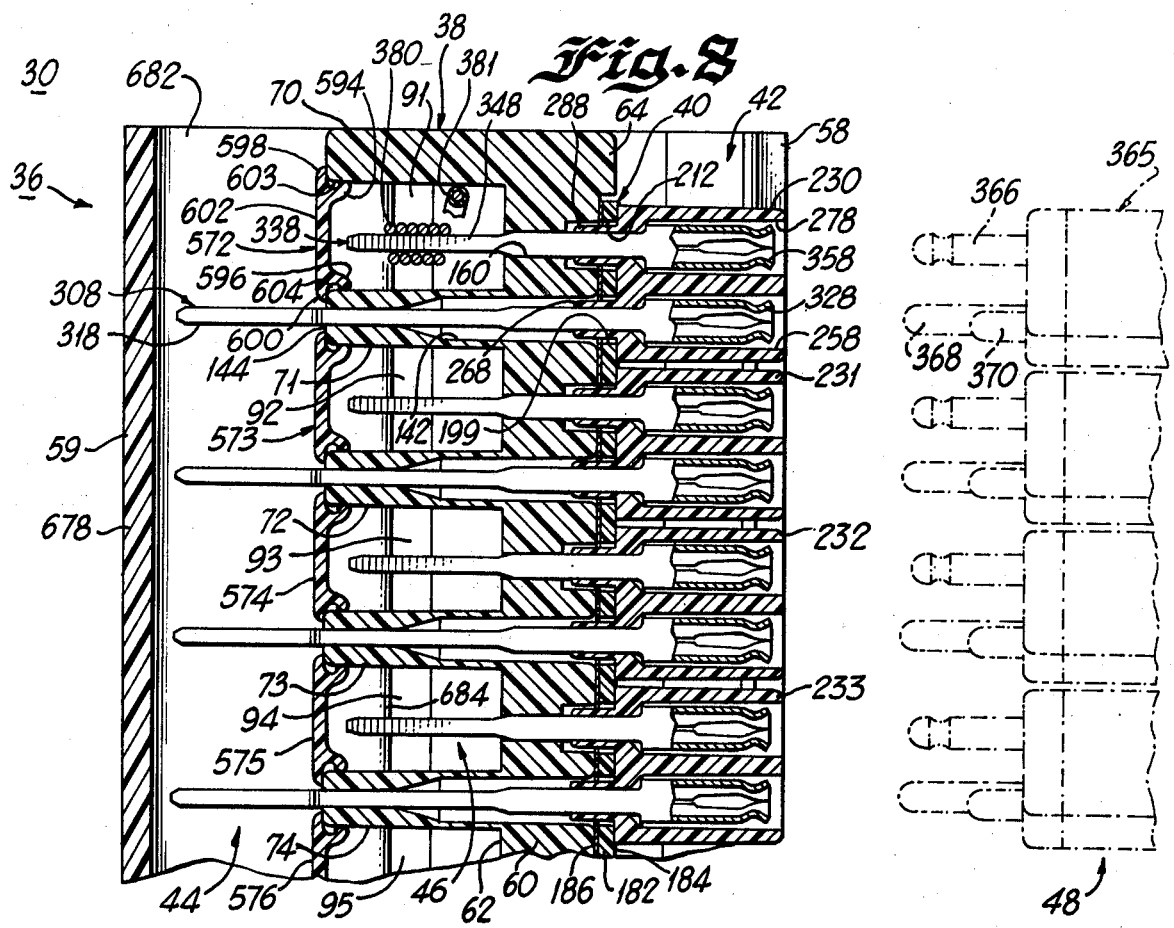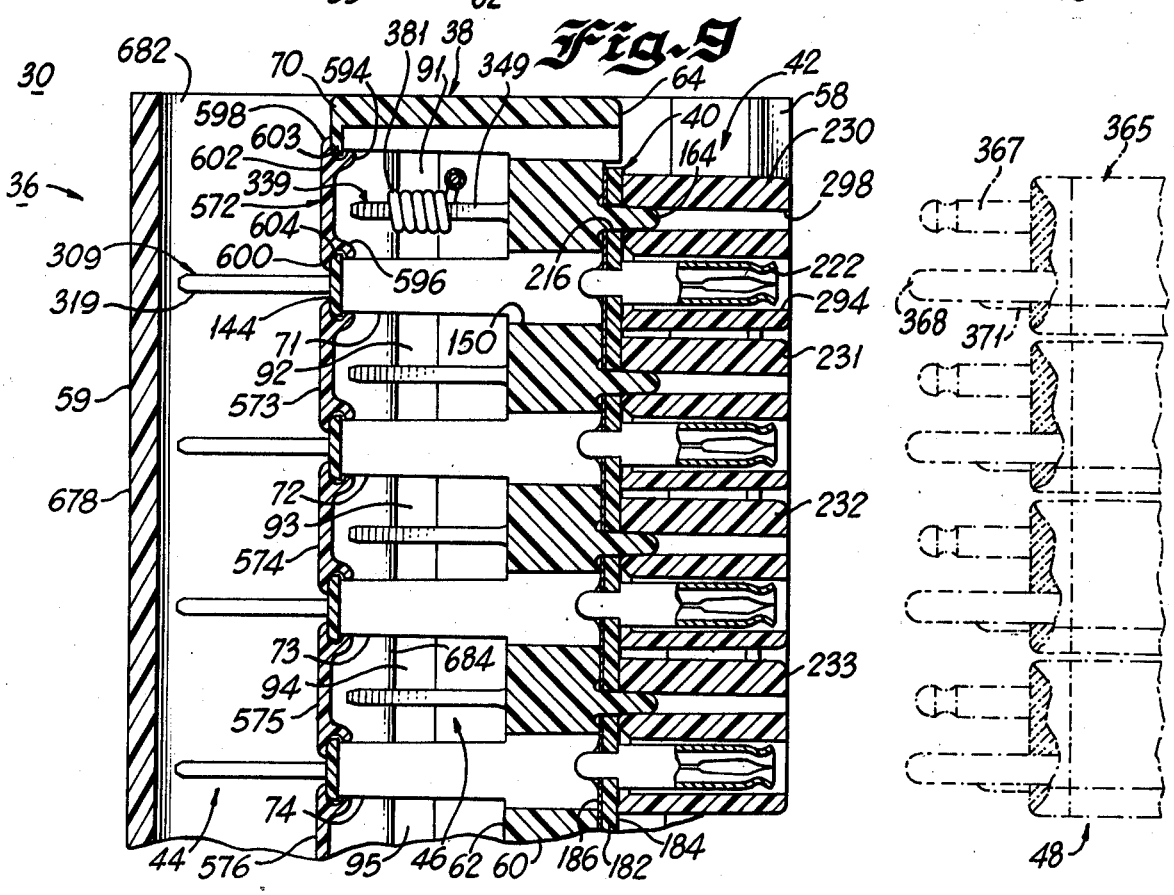

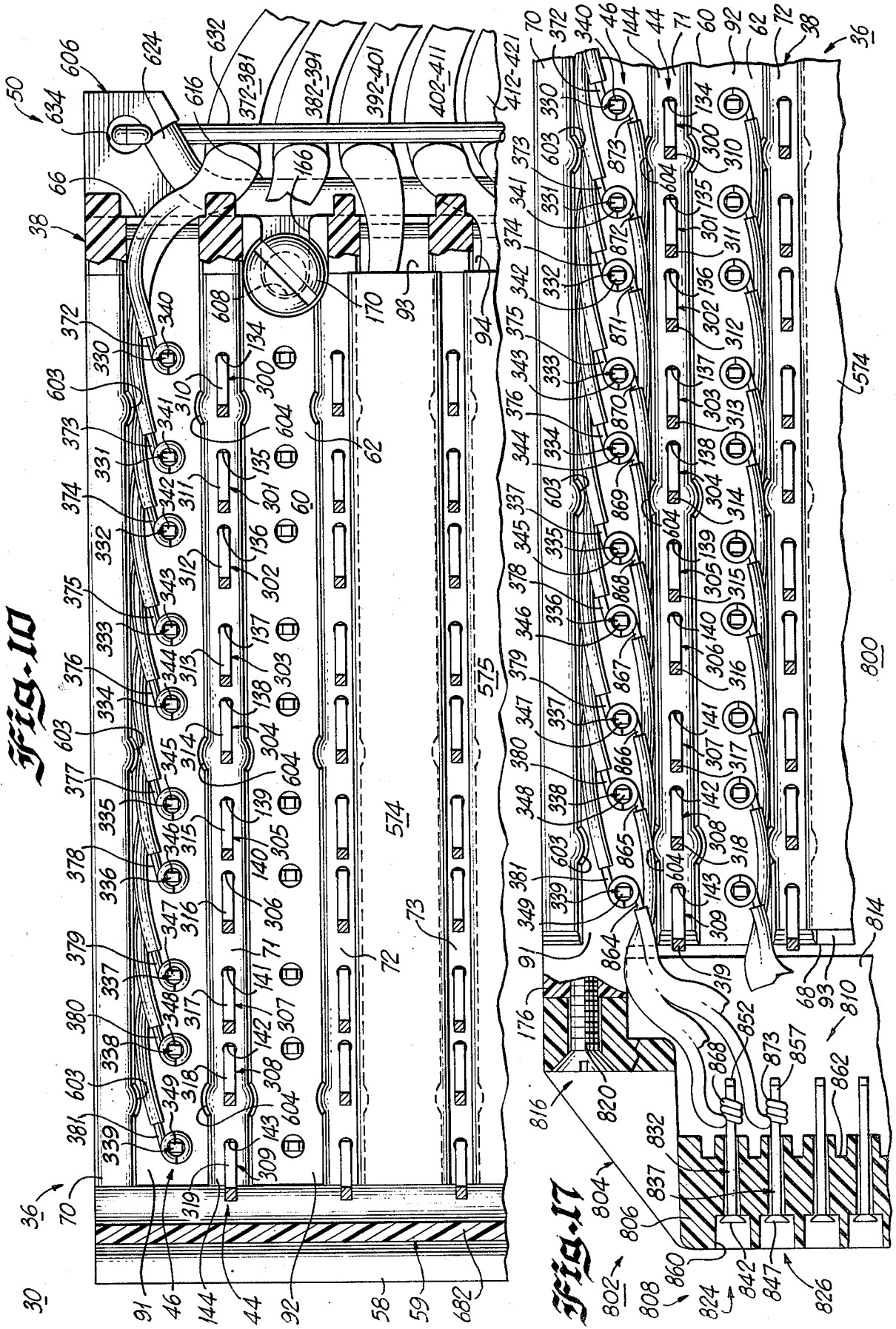

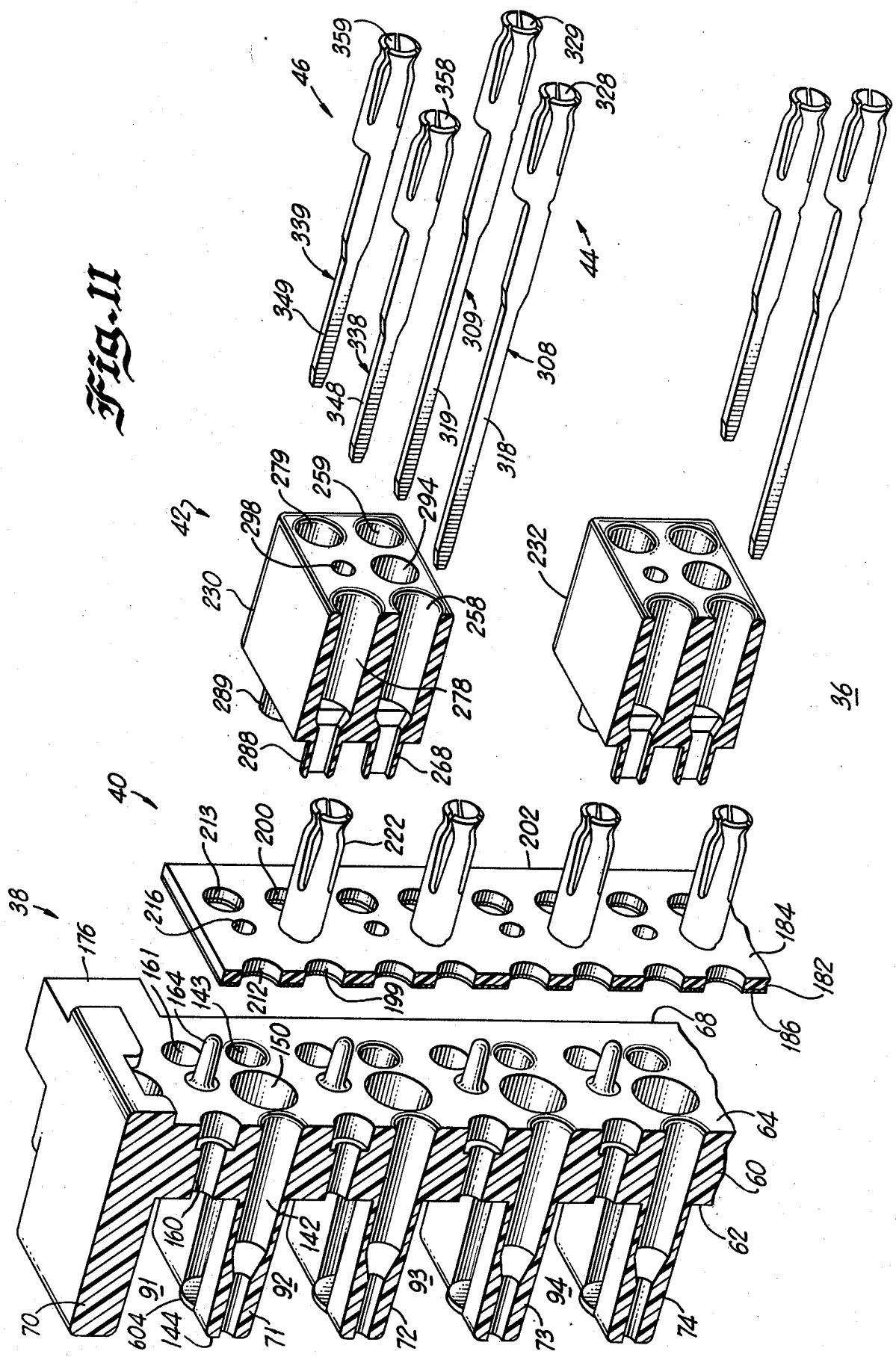

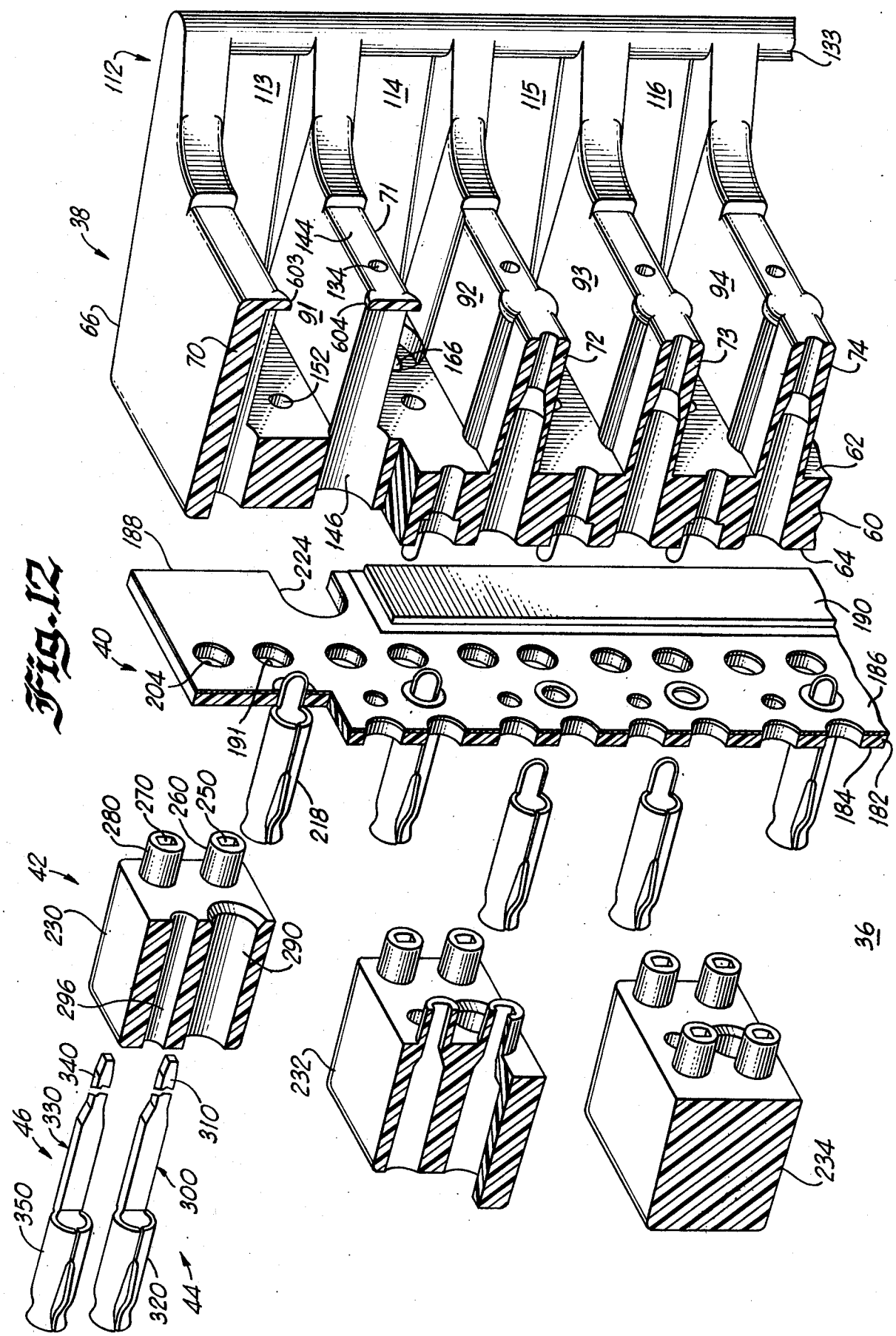

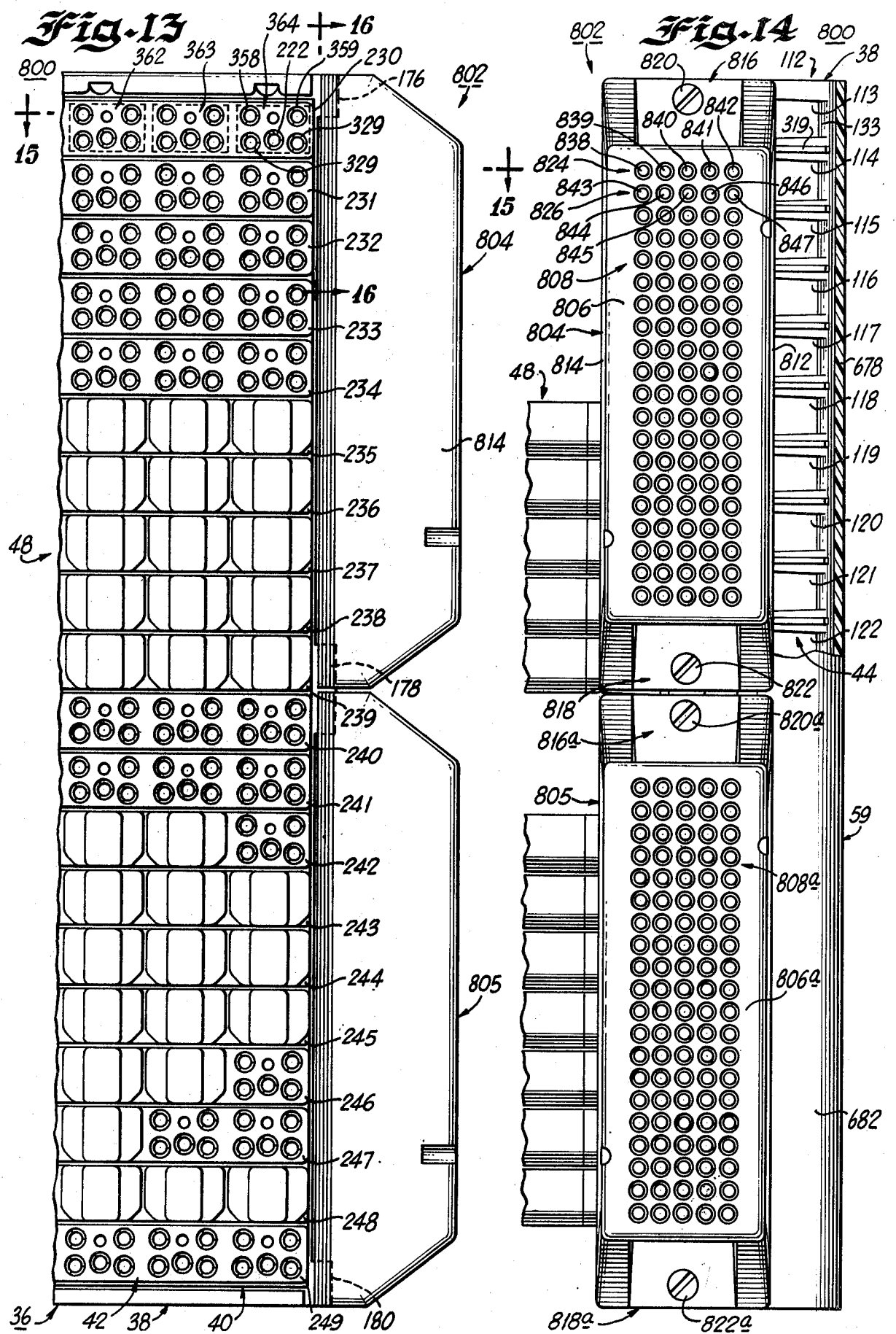

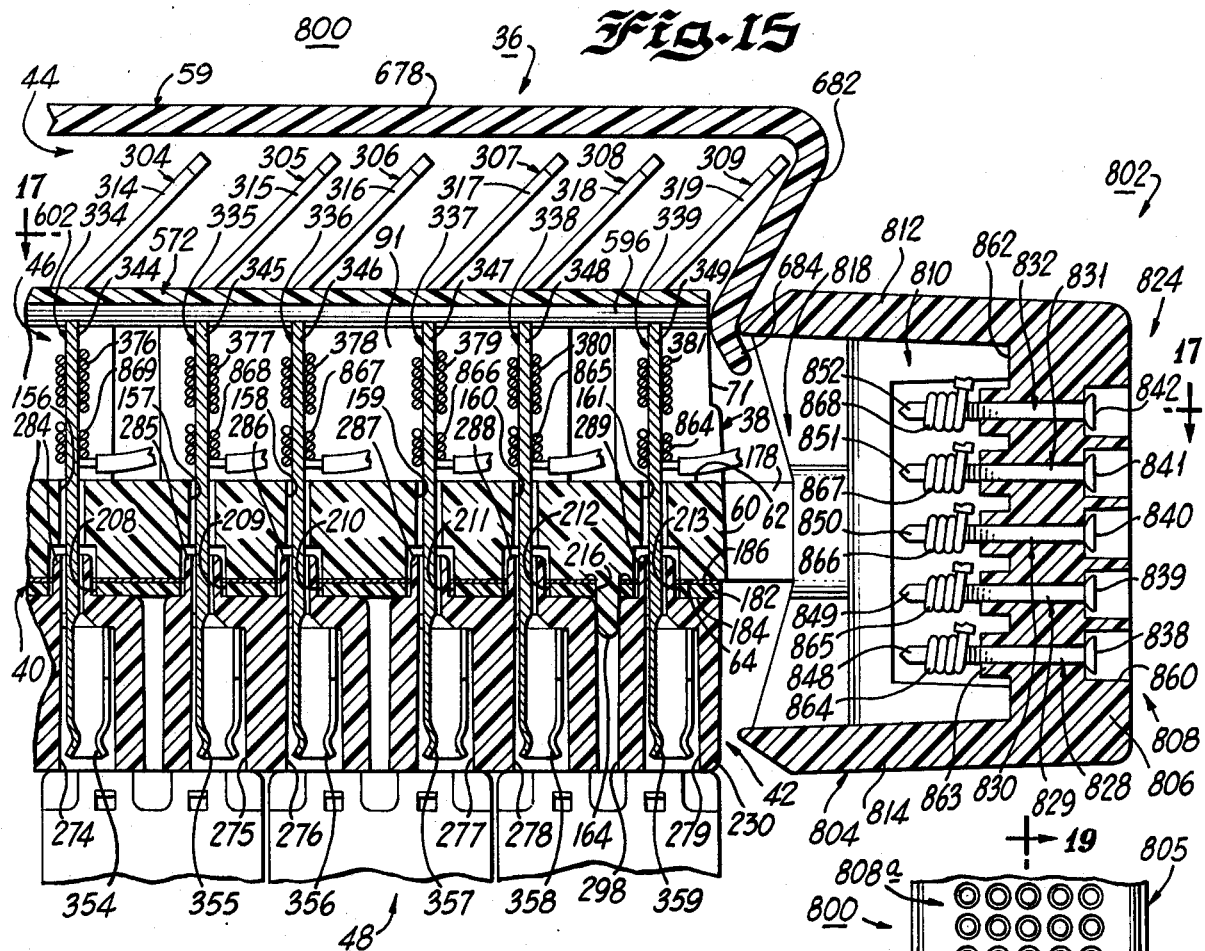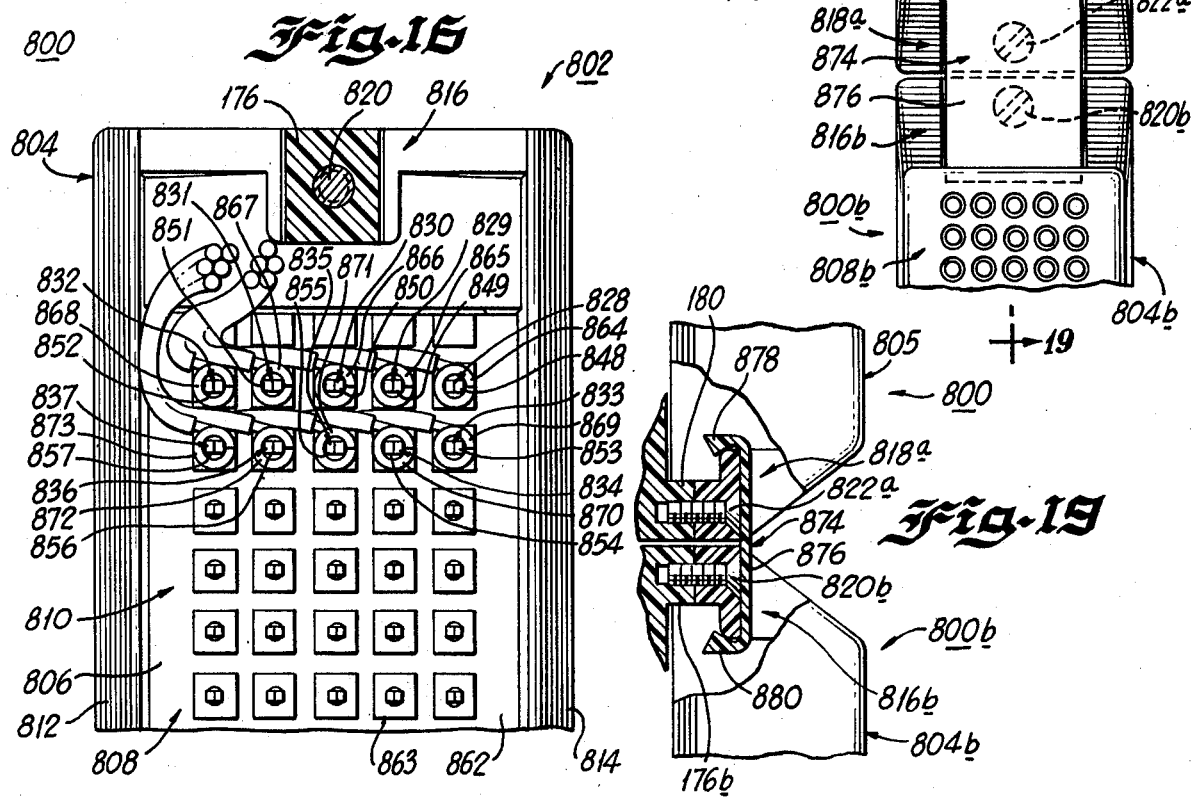

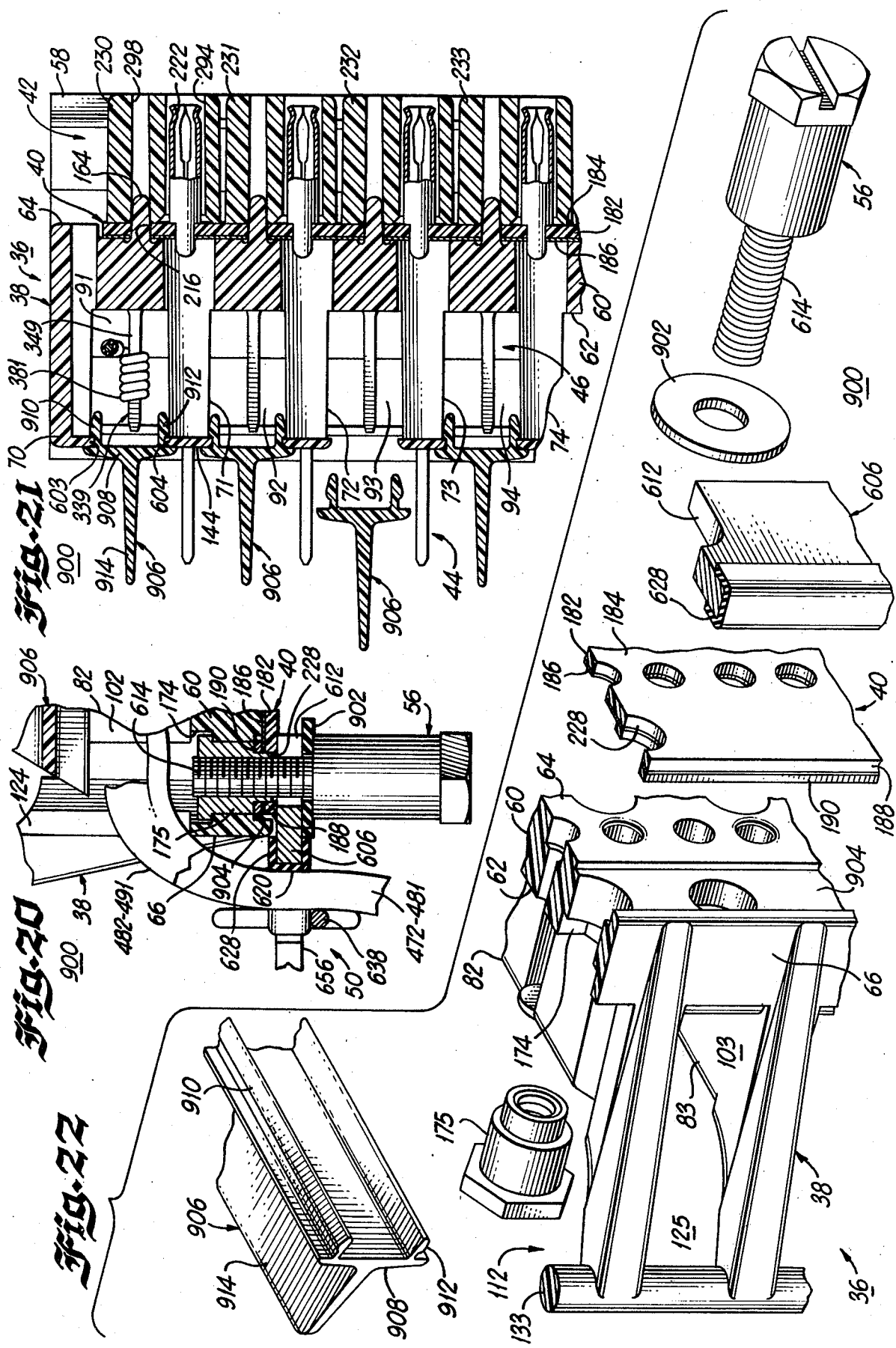

CONNECTOR ASSEMBLY FOR TELEPHONE DISTRIBUTION EQUIPMENT

This invention relates to a connector for telephone distributing equipment, and more particularly, to a new and improved connector for mounting a plurality of plug-in type protector assemblies in a minimum amount of space on telephone central office main distribution frames while providing improved access to terminals to which telephone lines are to be connected.

Each telephone line in a telephone system must be protected from high voltages and surge currents which might occur on the telephone line and which could damage telephone equipment to which the lines are coupled. Normally, for each pair of telephone lines which is extended into a telephone central office, a plug-in type protector assembly or module is utilized to connect the pair of incoming lines (sometimes referred to as outside plant cables or lines) to central office lines which are coupled to telephone equipment in the central office, such as central office switching equipment. The protector assembly or module is also used to protect the equipment to which the incoming telephone line is connected from the high voltages and current surges occurring on the line.

The protector assembly so protects the lines by means of one or more arresters contained in the protector assembly and coupled to the telephone lines. When a high voltage or current surge occurs on the telephone line to which the arrester is connected, a spark gap in the arrester coupled to that line sparks over so that the telephone line is coupled directly to ground potential through the arrester and the telephone equipment is protected from any damaging potential. Various types of protector modules may be utilized in so connecting the incoming telephone lines to telephone equipment while protecting those telephone lines, one of which such protector modules is disclosed in a copending application Ser. No. 737,326, filed on Nov. 1, 1976 and assigned to the same assignee of record of the present application. As discussed in that application, various types of arresters may be used within the protector module to provide for the protection of the telephone lines.

In order for the protector module or assembly to so connect and protect the incoming telephone lines, a connector or interface must be provided on which the plug-in type modules may be disposed and by which the necessary connections from the incoming telephone lines to the central office telephone lines can be made. One such type of connector is disclosed in U.S. Pat. No. 3,947,732, which patent is also assigned to the assignee of record of the present application. It provides for the mounting of up to one hundred such plug-in type protector modules and was so designed that it occupied a lesser amount of space on the telephone central office main distribution frame than other such connectors enabling more connectors, and hence more plug-in type protector modules, to be mounted on the distribution frames.

In the case of the connector disclosed in the aforementioned U.S. Pat. No. 3,947,732, the connector was designed to be mounted on the telephone distribution frames such that the front face on which was mounted the protector modules was generally parallel to the front face or plane of the distribution frame. In this manner the protectors project out from or generally perpendicular to the front face of the distribution frame. In order to even further decrease the vertical and horizontal space occupied by connectors on which the plug-in type protector modules were mounted, connectors have been designed which extend generally perpendicular out from the front face of the main distribution frames such that the protector modules extend generally parallel to the front face of the distribution frame. Certain of these types of connectors are disclosed in U.S. Pat. Nos. 4,037,910 and 4,012,096. The connector of the present application is of this latter type and is an improvement over previously designed connectors of this type.

Accordingly, objects of the present invention are to provide a new and improved connector for use in telephone central office distributing equipment; to provide a new and improved connector that extends generally perpendicular to the plane of the main distribution frames on which the connectors are to be mounted; to provide a new and improved connector that mounts plug-in type protector assemblies or modules in a minimum amount of space on telephone central office main distribution frames while enabling the efficient handling of both incoming telephone lines and central office lines to which the protector assemblies are coupled; to provide a new and improved connector structure that facilitates the manufacturing of the connector including a sandwich type of structure consisting of a connector base, a ground plate assembly, and protector module pedestals held together by the terminal receptacles used in the connector; to provide a new and improved mounting bracket for a connector permitting the rotation of the connector so as to facilitate access to the terminal pins used in the connector; to provide a new and improved mounting bracket for a connector which facilitates the handling and identification of incoming telephone lines or outside plant cables; to provide a new and improved ground plate assembly for the connector of the present invention having an insulating side and conductive side to which ground receptacles are connected; to provide a new and improved connector having means to selectively connect a ground plate assembly to ground through the mounting bracket used with the connector or through a separate grounding path; and to provide a new and improved connector having clips to align adjacent connectors mounted on the main distribution frame.

In accordance with these and many other objects, an embodiment of the present invention comprises a connector assembly for interfacing, by means of plug-in type protector modules, a plurality of incoming telephone lines to central office telephone lines coupled to telephone central office switching equipment or the like. The connector has a generally elongated connector base having opposed sides or faces from one side of which projects rows of ledges to form a plurality of rows of troughs or channels on the one side. A first set of base terminal holes extend through each of the ledges to the other side of the connector base and a second set of base terminal holes extends from each of the channels to the other side of the connector base such that together with base ground holes on the other side of the connector base the holes are formed into a plurality of rows and columns of base socket groups on the other side of the base. The other side of the base also has positioning tabs extending therefrom and a fanning strip is integrally formed on one elongated edge of the base, projects out from the one side of the base and has openings in alignment with the channels formed on the one side of the base.

A ground plate assembly having one side formed of insulating material and the other side formed of conductive material with a busbar or grounding path along one edge of the conductive side also has a plurality of terminal holes formed into a plurality of rows and columns of terminal hole groups which are adapted to be aligned with the first and second sets of base terminal holes on the other side of the base in each of the base socket groups when the ground plate assembly is properly positioned by the positioning tabs with its conductive side against the other side of the base. The ground plate assembly also has ground receptacles extending from the insulating side and coupled to the conductive side.

A plurality of pedestals, each corresponding to one row of the socket groups on the base, is positioned on the insulating side of the ground plate assembly such that the positioning tabs extend through the ground plate assembly into positioning holes in the pedestals and projections extending from the pedestals extend from one side of the pedestals through the terminal holes in the ground plate assembly into the first and second sets of terminal holes in the base. First and second sets of pedestal terminal holes extend through the pedestal projections to the other side of the pedestals and together with another set of ground holes formed in the pedestals form pedestal socket groups. The ground holes in the pedestals are adapted to receive the ground receptacles extending from the ground plate assembly and the first and second sets of pedestal terminal holes are adapted to receive terminal receptacles, the receptacle portions of which are disposed in the pedestal terminal holes and the pin portions of which extend through the pedestal projections such that the pin portions extend through the terminal holes in the ground plate assembly and through the first and second sets of terminal hole groups in the connector base. The terminal receptacles being so inserted through the pedestals, and the connector base maintain the connector base, the ground plate assembly and the pedestals properly positioned to form the connector.

In the preferred embodiment, covers are provided over each of the channels to cover the terminal pins extending into the channels as well as the incoming wires that are coupled to those terminal pins. In addition, a test field terminal block which has terminals that are coupled to the incoming telephone line terminals may be mounted on one elongated edge of the connector base opposite the edge on which the fanning strip projects.

The present invention also comprises a new and improved mounting bracket for the connector of the present invention, which improved bracket mounts the connector to the main distribution frame system in a telephone central office such that the connector projects generally perpendicular to the front face of the framing system. The bracket has a series of generally U-shaped grooves in which groups of incoming wires can be clipped for the efficient handling and identification of incoming telephone lines. Moreover, the mounting bracket has angular slotted mounting recesses that allow the mounting bracket, and hence the connector, to be rotated so that it projects approximately 60° from the front face of the main distribution frame and personnel can have access to the outside plant terminal pins extending from the base terminal holes on the one side of the connector base.

Many other objects and advantages of the present invention will become apparent from the following detailed description in conjunction with the following drawings:

FIG. 3 is a cross-sectional view of the connector assembly of FIG. 2 taken along line 3—3 of FIG. 2;

FIG. 4 is a partial cross-sectional view of the connector assembly of FIG. 2 taken along line 4—4 of FIG. 2;

FIG. 5 is a partial cross-sectional view of the connector assembly of FIG. 2 taken along line 5—5 of FIG. 2;

FIG. 6 is a cross-sectional view of the connector assembly of FIG. 2 taken along line 6—6 of FIG. 2;

FIG. 7 is a cross-sectional view of the connector assembly of FIG. 2 taken along line 7—7 of FIG. 2;

FIG. 8 is a partial cross-sectional view of the connector assembly of FIG. 2 taken along line 8—8 of FIG. 2;

FIG. 9 is a partial cross-sectional view of the connector assembly of FIG. 2 taken along line 9—9 of FIG. 2;

FIG. 10 is a partial cross-sectional view of the connector assembly shown in FIG. 6 taken along line 10—10 of FIG. 6;

FIG. 11 is an exploded partially cut away perspective view of the connector shown in FIGS. 1-10;

FIG. 12 is an exploded partially cut away perspective view of the connector shown in FIGS. 1-10

FIG. 13 is a partially cut away elevation view disclosing an alternate embodiment of the connector of the present invention having a test field assembly;

FIG. 14 is an end view of the connector of FIG. 13;

FIG. 15 is a partially cut away cross-sectional view of the connector of FIG. 13 taken along line 15—15 of FIG. 13;

FIG. 16 is a partial cross-sectional view of the connector of FIG. 13 taken along line 16—16 of FIG. 13;

FIG. 17 is a partial cross-sectional view of the connector of FIG. 15 taken along line 17—17 of FIG. 15;

FIG. 18 is a partial end view of two connectors of the type shown in FIG. 13 joined together by an alignment clip;

FIG. 19 is a partial cross-sectional view of the connector of FIG. 18 taken along line 19—19 of FIG. 18;

FIG. 20 is a cross-sectional view of the type shown in FIG. 5 of the drawings showing an alternate grounding mechanism;

FIG. 21 is a cross-sectional view similar to FIG. 9 disclosing an alternate embodiment of covers for the troughs in the connector of the present invention; and FIG. 22 is an exploded partially cut away prespective view of the connector embodying the present invention illustrating the alternate embodiments shown in FIGS. 20 and 21.

Figure 1:
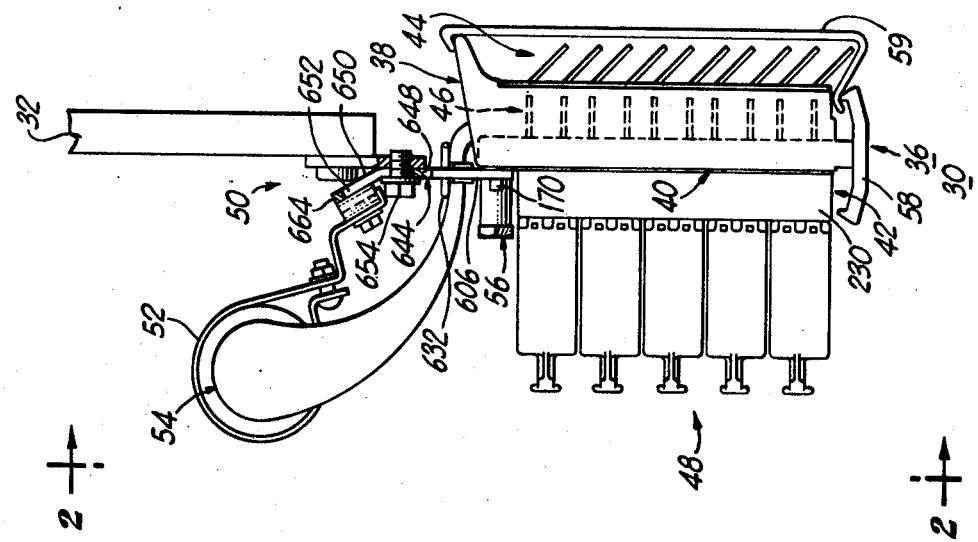
FIG. 1 is a plan top view of the connector assemblies embodying the present invention illustrating the mounting of these connector assemblies on telephone office main distribution frame members with the center connector assembly being rotated to facilitate access to outside plant terminal pins projecting from the connector.
Figure 1:
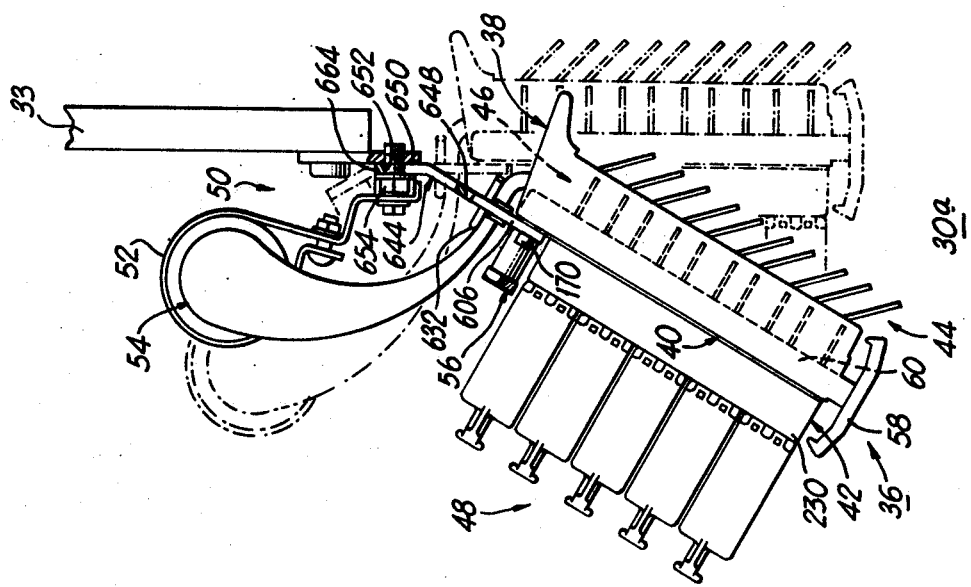
Figure 1:
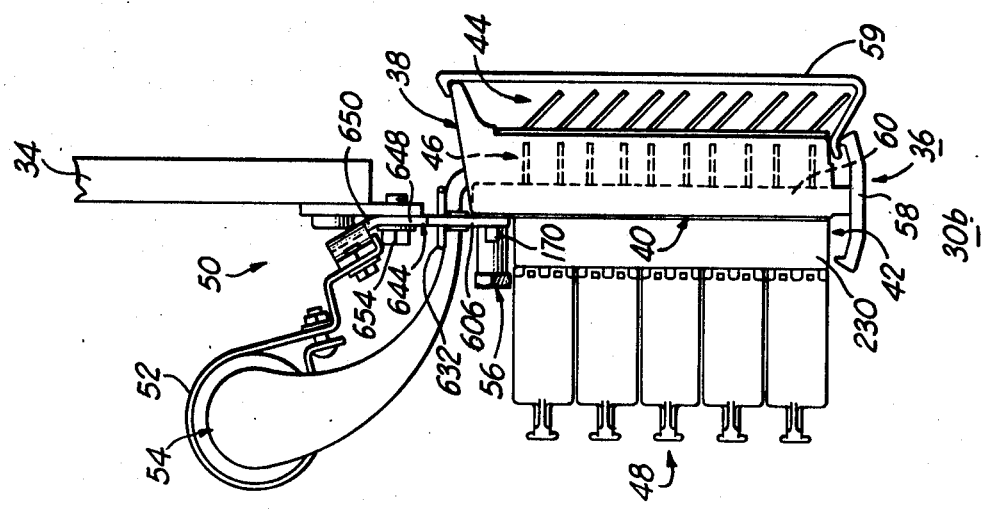

Referring now more specifically to FIG. 1 of the drawings, therein is disclosed a connector assembly which is generally designated by the numeral 30 and which embodies the present invention. Two other connector assemblies, 30a and 30b, are disclosed in FIG. 1 to illustrate the mounting of various ones of the connector assemblies of the present invention on framing members 32, 33 and 34, respectively, forming a part of a main distribution frame on which such connector assemblies are mounted in a telephone central office. The framing members 32, 33 and 34 are vertically extending framing members which together with horizontal framing members form the main distribution frame. The vertical members 32, 33 and 34 are normally separated from other vertical members by horizontal distances of approximately 8 inches. Similarly, the horizontal members are also about 8 inches apart. In addition, a jumper ring is located between each of the horizontal members and is set a distance away from the front portion of the main distribution frame on which connector assemblies, such as connector assemblies 30, 30a and 30b, are mounted. Parts or components on the connector assemblies 30a and 30b are designated by the same numbers as corresponding parts or components on the connector assembly 30.

With respect to the connector assembly 30, the connector assembly 30 includes a connector 36 comprising a connector base 38, a ground plate assembly 40, and a plurality of pedestals 42. The connector base 38, the ground plate assembly 40, and the pedestals 42 are maintained in what might be termed a sandwiched configuration by central office terminals 44 and outside plant or incoming telephone line terminals 46, which extend through the pedestals 42, the ground plate assembly 40 and the connector base 38. As is apparent from FIG. 1, the connector assembly 30 is designed to mount a plurality of plug-in type protector modules or assemblies 48 which not only couple incoming telephone lines to central office telephone lines, but also may contain appropriate arresters to provide protection to those lines from high voltages or surge currents occurring on them.

The connector assembly 30 also includes an adjustable mounting bracket 50 which mounts the connector 36 to the distribution frame member 32 and has a cable mounting bracket 52 for mounting a cable 54, containing the incoming telephone lines, adjacent the connector 36. The mounting bracket 50 is of the type that enables the connector 36 to be rotated, as illustrated in connection with the connector assembly 30a, so that personnel have access to the outside plant terminals 46. The connector assembly 30 also has a grounding screw 56 which enables the ground plate assembly 40 to be coupled to the mounting bracket 50, or in the alternative, to a separate grounding path other than through the mounting bracket 50. In addition, the connector assembly 30, in the embodiment disclosed in FIG. 1, has an identification plate 58 on which connecting instructions or the like may be mounted in connection with the connector assembly 30. Moreover, to protect the central office terminals 44, a central office terminal cover 59 is provided.

The connector assembly 30 thus acts as an interface between incoming telephone lines and telephone central office lines which are connected to each other and protected by means of the plug-in type protector modules 48. The connector assembly 30 also mounts the protector modules 48 in a minimum amount of space on the main distribution frame formed in part by the members 32, 33 and 34, while enabling personnel easy access to the central office terminals 44 and the outside plant terminals 46.

The connector portion 36 of the connector assembly 30 is best seen in FIGS. 2-12 of the drawings and includes the connector base 38 which is a generally rectangularly shaped panel 60 made of an appropriate insulating material such as thermal plastic polycarbonate. The panel 60 has opposite faces or sides 62 and 64 extending between elongated edges 66 and 68. A plurality of ledges or raised portions 70-90 project from the side 62 of the panel 60 and extend between the elongated edges 66 and 68 so as to form rows of ledges along the face 62. In between adjacent ones of the ledges 70-90, troughs or channels 91-110 are formed into rows along the face or side 62 of the connector panel 60. Along the edge 66 of the panel 60 is a fanning strip 112 which projects generally perpendicularly from the face 62 of the connector panel 60 and forms multi-planar openings 113-132 between the panel 60 and a rail 133. The openings 113-132 are in alignment, respectively, with the channels 91-110 that are formed on the face 62 of the connector panel 60. As described in further detail hereinafter and as described in U.S. Pat. No. 3,947,732, the openings 113-132 in the fanning strip 112 enable the efficient handling and identification of the incoming telephone lines in the cable 54 which are to be coupled to outside plant terminals 46 located in the channels 91-110.

As particularly illustrated in connection with the ledge 71 in FIG. 7, a first set of terminal holes 134-143 extends through the connector panel 60 from the side 64 and through each of the ledges 71-90 to an edge 144 of the ledge 71. These holes 134-143 are designed to receive the pin portions of the central office terminals 44. In addition, each of the ledges 71-90, as illustrated in connection with the ledge 71, have ground holes or recesses 146-150.

As best seen in FIG. 6 of the drawings, the connector base 38 also has a second set of terminal holes 152-161 which extends from the face or side 64 of the connector base 38 through the panel 60 into the channel 91. Similarly, each of the other channels 92-110 have the same set of terminal holes. These terminal holes 152-161 are designed to receive the pin portion of the outside plant terminals 46.

As best seen in FIGS. 6, 9 and 11-12, the connector base 38 also has two tabs 162 and 164 extending from the face 64 of the connector panel 60 near the edges 66 and 68, respectively, generally in alignment with the terminal holes 152-161. Similar such tabs as tabs 162 and 164 are located in alignment with the other of the second sets of terminal holes located along the panel 60. The tabs 162 and 164 aid in properly aligning the ground plate assembly 40 and the pedestals 42 with the connector base 38 when the connector 36 is assembled.

In addition, the connector base 38 has slotted holes 166 and 168 for the receiving of mounting screws 170 and 172, respectively, which attach the mounting bracket 50 to the connector 36 and has a ground screw receiving hole 174 through which the ground screw 56 can be inserted. The holes 166 and 168 have recesses in the face 62 of the panel 60 into which the heads of the screws 170 and 172 respectively are disposed. Similarly, the hole 174 has a recess in the face 62 of the panel 60 to facilitate the mounting of a ground adapter 175. The connector base 38 also has integrally formed projections 176, 178 and 180 projecting from the edge 68 on which the identification plate 58 may be mounted.

When the connector assembly 30, and more particularly the connector 36, is assembled, the ground plate assembly 40 is positioned against the elongated side or face 64 of the connector base 38. The ground plate assembly 40 (see FIGS. 11 and 12) includes a generally rectangular shaped copper epoxy glass laminate sheet or ground plate 182 having one side 184 made of an appropriate insulating material such as a glass laminate board and another side 186 made of an appropriate conductive material, such as copper epoxied to the glass laminated board 184. Essentially, the ground plate 182 is very similar to a printed circuit board having the one side 184 nonconductive and the other side 186 conductive. The ground plate assembly 40 along one edge 188 on the conductive side 186 of the ground plate 182 has a conductive busbar 190 (FIG. 12). The busbar 190 is so located that any fault current that is conducted to the ground screw 56 from any portion of the ground plate assembly 40 is directed through the conductive busbar 190.

A first set of terminal holes 191-200 are disposed in a row across the ground plate 182 from the edge 188 to an edge 202. The terminal holes 191-200 are so located that when the ground plate assembly 40 is positioned against the face 64 of the connector base 38, the terminal holes 191-200 are in alignment with the terminal holes 134-143 located in the connector base 38. A similar set of terminal holes are located in rows across the ground plate assembly 40 between the edges 188 and 202 so as to be in alignment with the other sets of base terminal holes extending through the connector panel 60 and the ledges 71-90.

A second set of terminal holes 204-213 are disposed through the ground plate 182 in a row between the edges 188 and 202 of the ground plate assembly 40. These terminal holes 204-213 are positioned on the ground plate assembly 40 so that when the ground plate assembly 40 is positioned against the face 64 of the connector base 38 the holes 204-213 are in alignment with the terminal holes 152-161 in the connector base 38. Similarly, other rows of such terminal holes are located in the ground plate assembly 40 to be in alignment with the terminal holes extending through the connector panel 60 into the channels 92-110.

In order for the ground plate assembly 40 to be properly positioned adjacent the face 64 of the connector base 38, tab positioning holes 214 and 216 are located in the plate 182 and are designed to receive the tabs 162 and 164, respectively. Similar such holes are disposed on the ground plate assembly 40 for receiving the other tabs extending from the face 64 of the connector base 38.

The ground plate assembly 40, as illustrated in FIGS. 7, 11 and 12 of the drawings, also contains rows of ground receptacles, such as the row containing ground receptacles 218-222. The receptacles, such as the receptacle 222 (FIG. 11), projects outwardly from the insulative side 184 of the ground plate 182 and is inserted through the ground plate 182 so that it may be electrically coupled to the conductive side 186 of the ground plate 182 by soldering or the like. In this manner, each of the ground receptacles on the ground plate 182, such as the receptacles 218-222, are electrically coupled to the conductive side 186 of the ground plate assembly 40. As might be noted from FIG. 7 of the drawings, the portions of the receptacles 218-222 that are attached to the conductive side 186 of the ground plate 182 extend into the ground recesses 146-150, respectively, in the connector base 38. The ground plate assembly 40 also has slotted holes 224 and 226 through which the screws 170 and 172 extend and a hole 228 through the busbar 190 for insertion of the ground screw 56.

Figure 2:
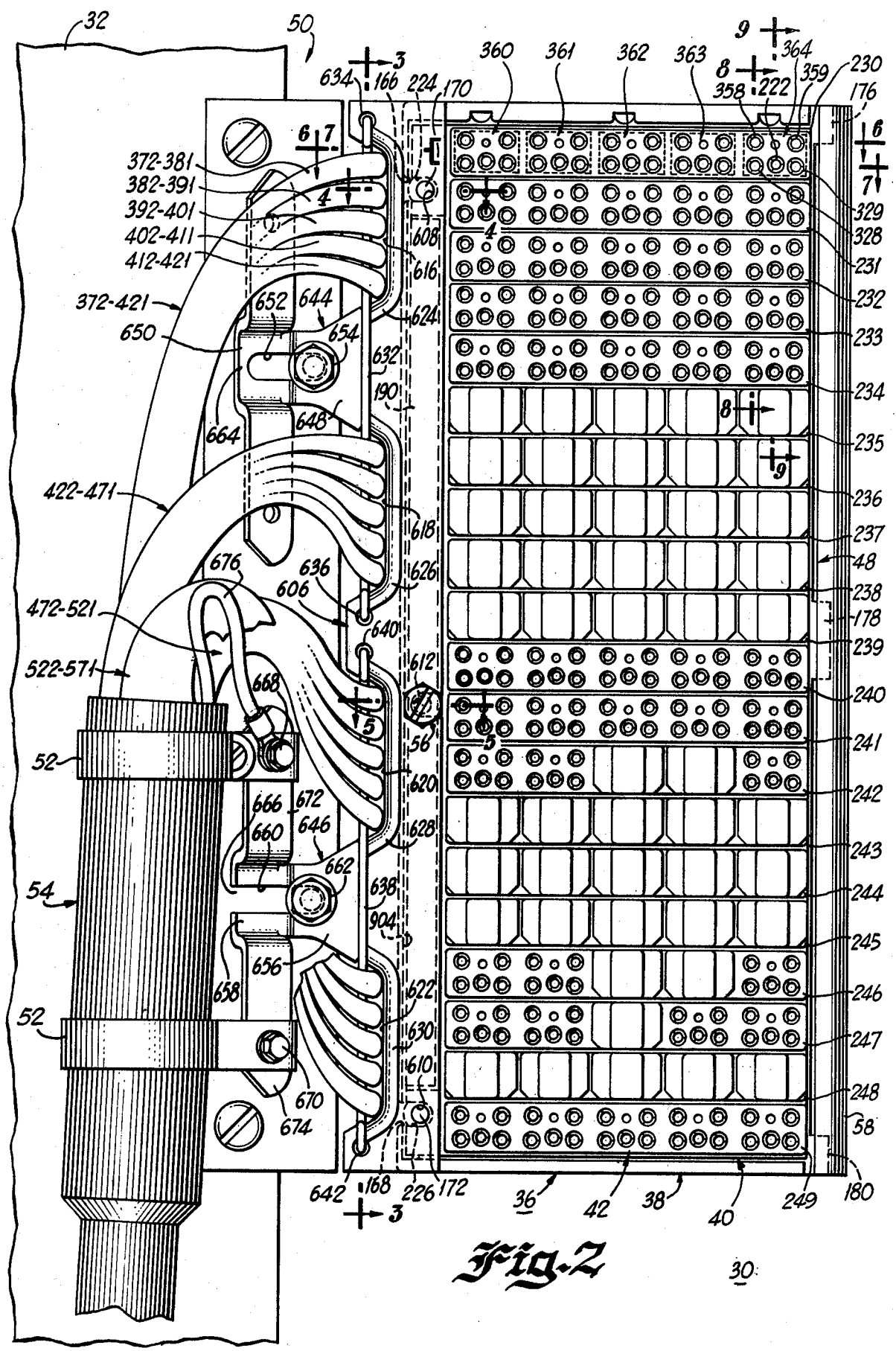
FIG. 2 is an elevation view of one side of one of the connector assemblies of FIG. 1 as viewed from line 2—2 of FIG. 1.

The other portions, from which the connector 36 is formed, are the pedestals 42. As best seen in FIG. 2 of the drawings, the pedestal portions 42 of the connector 36 actually comprise pedestals or receptacle receiving portions 230-249. However, in lieu of the pedestals 230-249, a single integral pedestal or receptacle receiving portion may be used. Each of the pedestals 230-249 is identical in construction and is made from the same insulating material as the connector base 38. As illustrated in FIGS. 6 and 7 in connection with pedestal 230, each of the pedestals 230-249 is of a generally elongated rectangular shape and is designed to fit between the elongated edges 66 and 68 of the connector base 38. The pedestal 230 has a first set of pedestal terminal holes 250-259 extending through projections 260-269, respectively, which fit through the ground plate terminal holes 191-200 into the connector base terminal holes 134-143 when the connector 36 is assembled. The pedestal 230 also has a second set of terminal holes 270-279 extending through projections 280-289, respectively, which fit through the ground terminal holes 204-213 into the connector base terminal holes 151-161 when the connector 36 is assembled. The pedestal 230 also has ground receptacle holes 290-294 which are adapted to receive the ground receptacles 218-222, respectively, when the pedestal 230 is mounted against the ground plate 182.

Each of the pedestals 230-249, as is shown in connection with the pedestal 230, includes tab positioning holes 296 and 298. The holes 296 and 298 are adapted to receive the tabs 162 and 164, respectively, when the pedestal 230 is mounted as shown in FIG. 6.

As previously indicated, the central office terminals 44 and the outside plant terminals 46 when inserted through the pedestals 42, the ground plate assembly 40 and the connector base 38, maintain the pedestals 42, the ground plate assembly 40 and the connector base 38 together in a sandwiched configuration in order to form the connector 36. More specifically, when the connector 36 is to be assembled, the ground plate assembly 40 is positioned with its conductive side 186 against the face 64 of the connector base 38. The ground plate assembly 40 is maintained in proper position against the face 64 of the connector base 38 by the projecting tabs, such as the tabs 162 and 164, being inserted through the tab positioning holes 214 and 216, respectively, and similar such holes in the remainder of the ground plate 182. Once the ground plate assembly 40 is so positioned against the connector base 38, the various ones of the pedestals 230-249 may be mounted against the insulating side 184 of the ground plate 182. For instance, with respect to the pedestal 230, as particularly shown in FIGS. 6 and 7, the pedestal 230 is properly positioned against the ground plate 182 by means of the tabs 162 and 164 being inserted into the tab positioning holes 296 and 298, respectively. Moreover, when the pedestal 230 is so positioned against the ground plate 182, the ground receptacles 218-222 projecting from the insulating side 184 of the ground plate 182 are disposed in the pedestal ground holes 290-294, respectively, and the central office terminals 44 and the outside plant terminals 46 may be inserted through the pedestal 230, the ground plate assembly 40 and the connector base 38.

More specifically, the central office terminals 44 used in connection with the pedestal 230 include terminals 300-309 having respectively pin portions 310-319 and receptacle portions 320-329. On the other hand, the outside plant terminals 46 used in connection with the pedestal 230 include terminals 330–339 having respectively pin portions 340–349 and receptacle portions 350–359. When the central office terminals 300–309 are installed (FIG. 7), the receptacle portions 320–329 are located in the pedestal terminal holes 250–259, respectively, and the pin portions 310–319 extend through the respective projections 260–269, through the corresponding first set of terminal holes 134–143 in the ledge 71 extending from the face 62 of the connector panel 60 and out from the edge 144 on the ledge 71. Similar types of central office terminals 44 are positioned through the other pedestals 231–249 and through the other ledges 72–90 on the connector base 38. Once the pin portions 310–319 project from the top 144 of the ledge 71, the pin portions 310–319 are bent so as to extend at an angle of approximately 45° from the top edge 144 of the ledge 71.

The outside plant terminals 330–339 (FIG. 6) are also inserted through the pedestal 230 so that the receptacle portions 350–359 are disposed in the terminal holes 270–279 in the pedestal 230. The pin portions 340–349, respectively, extend through the projections 280–289 and the second set of terminal holes 152–161 in the connector panel 60 into the channel 91 formed between the ledges 70 and 71.

With these central office terminals 44 and outside plant terminals 46 so positioned through the pedestals 230–249, the ground plate assembly 40 and the connector base 38, the connector 36 and particularly the pedestals 230–249, the ground plate assembly 40 and the connector base 38 are maintained in somewhat of a sandwiched configuration by means of the press fitting insertion of the central office terminals 44 and the outside plant terminals 46 in and through the connector base 38.

With particular reference to FIG. 2 of the drawings and with reference to pedestal 230, once the pedestals 230–249 are so positioned and maintained in position with the ground plate assembly 40 and the connector base 38, the pedestal 230 forms five socket groups 360–364. As is apparent with respect to socket group 364, the socket group 364 is formed by the receptacle portion 358 of the outside plant terminal 338, the receptacle portion 328 of the central office terminal 308, the ground receptacle 222, the receptacle portion 329 of the central office terminal 309 and the receptacle portion 359 of the outside plant terminal 339. Such a socket group 364 comprising the receptacles 358, 328, 222, 329 and 359 provide means for plugging in one of the plug-in type protector modules 48. As more specifically shown with respect to a protector module 365 shown in FIGS. 8 and 9, the protector modules 48 each have a pair of outside plant pins 366 and 367 that are insertable into the receptacles 358 and 359, respectively, a ground pin 368 which is insertable into the ground receptacle 222 and central office pins 370 and 371, which are insertable into the receptacles 328 and 329, respectively. When the protector module 365 is so positioned in the socket group 364, the protector module 365 not only couples the central office terminal 308 to the outside plant terminal 338 and the central office terminal 309 to the outside plant terminal 339, but also protects any telephone lines coupled to those terminals 308, 338, 309 and 339 by coupling those terminals to its ground pin 368 in event of a high voltage or surge current.

As can be readily appreciated, since each of the pedestals 42 include five socket groups, such as the socket groups 360–364, the connector assembly 30 can mount up to one hundred protector modules 48. Since each of the protector modules 48 connects and protects a pair of incoming telephone lines, two hundred different incoming telephone lines included in the cable 54 may be coupled to central office telephone lines and protected from high voltages or surge currents by means of the connector assembly 30. Yet, the overall length of the connector assembly 30 from the ledge 70 to the ledge 90 may be as little as eleven inches so as to provide for ease in installing in the main distribution frame in a telephone central office.

The incoming telephone lines are normally contained in a cable such as the cable 54, which contains two hundred separate lines 372–571, or in other words, one hundred pairs of telephone lines. The mounting bracket 50, as will be described hereinafter, segregates the telephone lines 372–571 into the four groups, the first group containing lines 372–421, the second group containing lines 422–471, the third group containing lines 472–521 and the last group containing lines 522–571. As shown with respect to lines 372–381, the telephone lines 372–571 extend through the respective openings 113–132 in the fanning strip 112 so that ten telephone lines extend through each opening 113–132 in the fanning strip 112.

Since the opening 113 in the fanning strip 112 is in alignment with the channel 91, the group of incoming telephone lines 372–381 may be readily inserted into the channel 91. As best seen in FIG. 6 of the drawings, the lines 372–381 may be then wire wrapped about the pin portions 340–349 of the outside plant terminals 330–339, respectively. Likewise, the various other groups of ten incoming telephone lines from the cable 54 may be inserted into the other channels 92–110 formed on the side 62 of the connector panel 60 for connection to the other outside plant terminals 46. Once the incoming telephone lines 372–571 are so connected to the outside plant terminals 46, covers 572–591 may be positioned over the channels 91–110 (FIG. 3) to protect the outside plant terminals 46 and the connections made between those terminals 46 and the telephone lines 372–571.

The trough or channel covers 572–591, as illustrated in connection with the cover 572, are generally flat, somewhat pliable insulating material having elongated leg portions 594, 596, 598 and 600 extending from a central elongated support surface 602. The legs 594 and 598 fit about ears such as the ear 603 extending from the ledge 70 into the channel 91 and the legs 596 and 600 about ears, such as the ear 604 extending from the ledge 71 such that the cover 572 is resiliently disposed between the ledges 70 and 71 and the support surface 602 covers the trough 91. In this manner, the trough cover 572 may be snap fitted into the position between the ledges 70 and 71 or may be slid along between the ledges 70 and 71 in order to cover the channel 91. When the covers 572–591 are so positioned, they cover the channels 91–110 and protect the outside plant terminals 46 and the line connections made thereto.

As previously noted, the mounting bracket 50 not only mounts the connector 36 to the framing member 32, but also provides for the efficient handling of the telephone lines 372–571. More specifically, the mounting bracket 50 is made of appropriate conductive material, such as steel or the like, and has a support structure 606 designed to be positioned against the insulating side 184 of the ground plate 182 adjacent the edge 188. The support structure 606 has two threaded holes 608 and 610 which are adapted to be respectively placed in alignment with the holes 224 and 226 in the ground plate assembly 40 and the holes 166 and 168 in the connector base 38 so as to receive the mounting screws 170 and 172 in order to maintain the mounting bracket 50 in position. The support structure 606 has another hole 612 which is placed in alignment with the hole 228 in the ground plate 182 and the hole 174 in the connector base 38 so that the ground screw 56 may be properly inserted.

In the embodiment shown in FIGS. 1–12, the mounting bracket 50 is electrically coupled to the conductive side 186 of the ground plate 182 and thus to each of the ground receptacles, such as the ground receptacles 218–222, because the ground screw 56 fits against the support structure 606 and has a shank portion 614 which extends through the hole 612 in the support structure 606 of the mounting bracket 50 and through the hole 228 in the ground plate 182 so as to be threadily engaged in the ground adapter 175. The ground adapter 175 is positioned in the hole 174 in the connector panel 60 so as to be in electrical contact with the busbar 190 and hence the conductive side 186 of the ground plate 182. In this manner, each of the ground receptacles, such as the ground receptacles 218–222, and hence the ground pins on the protector modules 48, such as the ground pin 368 on the protector module 365, are coupled to the mounting bracket 50 and to the main distribution frame through the framing member 32 which are at ground potential.

The mounting bracket 50 also provides for the orderly handling and identification of the wires 372–571 by providing in the support structure 606 four generally U-shaped recesses or channels 616, 618, 620 and 622 through which the lines 372–521 may be extended. The U-shaped recesses or channels 616, 618, 620 and 622 have respectively U-shaped protective coverings 624, 626, 628 and 630 which may be of any appropriate resilient material, such as neoprene, in order to protect the lines 372–571 as they are extended through the U-shaped channels 616, 618, 620 and 622. As shown in FIG. 2 of the drawings, the lines 372–421 extend through the U-shaped channel 616 and the lines 422–471 extend through the U-shaped channel 618. These lines 372–471 are maintained in the channels 616 and 618 and protected from being damaged by a clip 632 which is insertable into a hole 634 located in the support structure 606 at one end of the channel 616 and a hole 636 located in the support structure 606 at the other end of the channel 618. Similarly, the lines 472–521 extend through the U-shaped channel 620 and the lines 522–571 extend through the U-shaped channel 622. These lines 472–571 are maintained in the U-shaped channels 620 and 622 and protected from being damaged by a clip 638 which is insertable into a hole 640 located in the support structure 606 on one side of the U-shaped channel 620 and a hole 642 located in the support structure 606 on the other side of the channel 622. As is illustrated in connection with the lines 372–421 extending through the U-shaped channel 616, once the lines 372–571 extend through the U-shaped channels 616, 618, 620 and 622, the fifty lines 372–421 in the channel 616 are easily segregated into bundles of ten to be inserted through the openings 113–117 in the fanning strip 112 for routing into the channles 91–95. These lines 372–421 can be readily coupled by standard wire wrapping techniques to the outside plant terminals 46. For instance, the lines 372–381 are connected to the terminals 330–339 in the channel 91. Once the lines 372–381 are so connected, the trough cover 572 may be positioned over the channel 91 as heretofore described.

The mounting bracket 50 also enables the connector 36 to be rotated, such as shown with respect to connector assembly 30a in FIG. 1, thereby providing access so that outside plant lines may be coupled to the outside plant terminals 46. In this regard, connecting legs 644 and 646 extend from the support structure 606. The leg 644 has a first mounting portion 648 extending generally in the plane of the supporting structure 606 and a second mounting portion 650 extending at an angle from the mounting portion 648. In the disclosed embodiment, the angle is about thirty degrees. An elongated hole 652 extends in both the mounting portions 648 and 650 and is adapted to receive a mounting screw 654 for attaching the leg 644 to the framing member 32. The leg 646 also has a first mounting portion 656 extending generally in the plane of the supporting structure 606 and a second mounting portion 658 extending at an angle from the mounting portion 656. Again in the disclosed embodiment, this angle is about thirty degrees. An elongated slotted hole 660 extends in both of the mounting portions 656 and 658 and is adapted to receive another mounting screw 662 for attaching the leg 646 to the framing member 32.

As is apparent from FIG. 2 of the drawings, the hole 652 has a closed end 664, whereas the slotted hole 660 has an open end 666 in the mounting portion 658. In order to mount the connector assembly 30 on the framing member 32, the connector 36 with the mounting bracket 50 attached thereto is placed adjacent the framing member 32 and the screw 654 is inserted through the hole 652 into the framing member 32. The screw 662 can then be inserted into the framing member 32 and since the hole 660 has the open end 666, the leg 646 may be positioned about the screw 662 as shown in FIG. 2.

With the mounting screw 654 extending through a portion of the hole 652 in the mounting portion 648 and the mounting screw 662 extending through the portion of the hole 660 in the mounting portion 656, the connector assembly 30 is positioned as shown in the right hand portion of FIG. 1 so that the connector 36 extends generally perpendicular to the front face of the framing member 32. However, with connector assemblies, such as connector assemblies 30, 30a and 30b, being positioned on adjacent framing members 32, 33 and 34, it is normally not possible for personnel to have access to the outside plant terminals 46 extending from the troughs 91–110.

Advantageously, by having the holes 652 and 660 extend into the mounting portions 650 and 658, respectively, the connector assembly 30 may be rotated to a position as shown with respect to connector assembly 30a shown in FIG. 1. More specifically, by loosening the screws 654 and 662, the connector assembly 30 may be slid slightly outwardly from the framing member 32 such that the screw 654 is positioned in the portion of the hole 652 located in the mounting portion 650 of the leg 644 and the screw 662 is positioned in the portion of the hole 660 disposed in the mounting portion 658 of the leg 646. Since the mounting portions 650 and 658 extend at an angle away from the mounting portions 648 and 656, respectively, the entire connector 36 will be rotated approximately thirty degrees to a position shown in FIG. 1 with respect to the connector assembly 30a. With the connector assembly 30a in the position shown in the solid lines in FIG. 1, personnel have access to the outside plant terminals 46. Since the hole 652 is closed at the end 664, the mounting bracket 50 cannot be completedly dislodged from the frame member 32 during this rotation process.

In addition, personnel may connect to the central office terminals 44 appropriate central office telephone lines extending through the openings 113-132 in the fanning strip 112 to other portions of the main distribution frame system through various jumper rings located in the frame system. In this regard, it should be noted that in many cases individual central office telephone lines must be identified. In order to identify these wires, personnel will pull on the wires extending through the fanning strip 112 so that they may be identified in some other location in the main distribution frame. The multiplanar openings 113-132 in the fanning strip 112 enable the personnel to so identify the central office telephone lines without unnecessary bending stresses being applied to those telephone lines.

In addition, the mounting bracket 50 enables the cable 54 to be maintained adjacent the connector 36. The cable bracket 52 is mounted on the leg 646 of the mounting bracket 50 by appropriate mounting screws 668 and 670 which extend through legs 672 and 674, respectively, extending from the mounting portion 658 of the leg 646. The cable 54 normally has a conductive cable shield. In order to couple this cable shield to ground potential, a jumper wire 676 may be provided that is crimped to that cable shield and is coupled to the cable mounting bracket 52 and the connector mounting bracket 50 by the mounting screw 668.

As previously indicated, the identification plate 58 may be mounted on the projections 176, 178 and 180 extending from the connector base 38. Necessary connection instructions concerning the connector 36 may be placed on the identification plate 58. In addition, the identification plate facilitates the positioning of the central office terminal cover 59 about the central office terminals 44.

More specifically, the central office terminal cover 59 has a generally flat body portion 678 at one end of which is a leg 680 extending therefrom which is adapted to be hooked about the rail 133 of the fanning strip 112. At the other end of the body portion 678 is a curved leg portion 682 having a curved projection portion 684 extending therefrom. As is apparent from FIGS. 6 and 7 of the drawings, the leg 684 may be inserted between the identification plate 58 and the ledges 70-90. With the leg 684 so positioned between the identification plate 58 and the ledges 70-90, the leg portion 680 may be positioned about the rail member 133 such that the cover 59 protects the connections made to the central office terminals 44. Advantageously, the fanning strip 112 provides an access route for the central office telephone lines that are coupled to the central office terminals 44. In addition, the cover 59 insures that personnel working on adjacent connectors to the connector 30 could not injure themselves on the projecting central office terminals 44.

Advantageously, the connector assembly 30 of the present application facilitates the actual construction of the connector base 36 while providing for the mounting of up to one hundred plug-in type modules 48 in a minimum amount of space in a telephone central office and while enabling the efficient handling of both the incoming or outside plant telephone lines, such as the lines 372-571, and the central telephone office lines coupled to the central office terminals 44. Moreover, by having a single ground plate assembly 40 sandwiched between the pedestals 42 and the connector base 38, each of the ground receptacles, such as the ground receptacles 218-222, may be readily mounted in the connector assembly 30 and connected to ground potential through the conductive side 186 of the ground plate 182, the busbar 190, the ground screw adapter 175, the ground screw 56, the mounting bracket assembly 50 and the mounting screws 654 and 662. Even though the ground plate assembly 40 is so positioned between the pedestals 42 and the connector base 38, and even though the pedestals 42, the ground plate assembly 40 and the connector base 38 are held together by the central office terminals 44 and the outside plant terminals 46 which extend through the pedestals 42, the ground plate assembly 40 and the connector base 38, the central office terminals 44 and the outside plant terminals 46 are maintained insulated from the conductive ground plane 186 of the ground plate 182 because the projections, such as projections 260-269 and 280-289, extending from the pedestal 230 insulate the central office terminals 44 and the outside plant terminals 46 that extend through those projections 260-269 and 280-289 into the connector base 38 from the ground plane 186.

In many cases, it is advantageous to provide a test field assembly with the connector assembly 30. The test field assembly enables personnel to readily plug in test equipment which electrically connects to the outside plant terminals 46 so as to test the lines 372-571 coupled to those terminals 46. In the embodiment of the connector assembly shown in FIGS. 13-17 of the drawings, there is disclosed a connector assembly 800 which embodies the present invention and which provides a test field assembly 802. Those elements or components of the connector assembly 800 which are identical to corresponding components or elements of the connector assembly 30 are designated by the same reference numerals.

When the test field assembly 802 is used in connection with the connector assembly 800, the identification plate 58 used in connection with the connector assembly 30 is not mounted on the projections 176, 178 and 180. Instead, a test field terminal block 804 is mounted on the projections 176 and 178 and another test field terminal block 805 is mounted on the projections 178 and 180. The test field blocks 804 and 805 are identical in structure, and portions of the block 805 which are identical to corresponding portions of the block 804 are designated by the same reference numerals as those used in connection with the block 804 followed by the letter "a". As illustrated in connection with the test field block 804, the test field blocks 804 and 805 are made of an appropriate insulating material such as that from which the connector base 38 is formed. The block 804 has a test field terminal holding portion 806 having a plurality of rows of test terminal mounting holes 808. In the disclosed embodiment, the test terminal block 804 has twenty rows of such test terminal mounting holes with five holes in each row so as to be capable of mounting one hundred test terminals 810.

The block 804 includes side portions 812 and 814 that extend from the test field terminal holding portion 806 and mounting end portions 816 and 818 extending from either end of the test field terminal holding portion 806. The mounting end 816 has an appropriate hole through which a mounting fastener or screw 820 can be inserted so that the screw 820 is threadily engaged into the projection 176. Likewise, the mounting end 818 has a hole through which a mounting fastener or screw 822 may be inserted so as to be inserted into a part of the projection 178. Each of the test terminal mounting holes 808 is adapted to receive one of the test terminals 810.

With specific reference to the first two rows 824 and 826 of test terminal mounting holes 808 in the test field terminal holding portion 804, each of the holes 808 in the rows 824 and 826 has a test terminal designated as 828-837. The terminals 828-837 respectively have testing portions or heads 838-847 and pin portions 848-857. The heads 838-847 fit within recesses within the test terminal holes 808, such as the recess 860 in which the head 838 of the test terminal 828 is disposed. The pin portions 848-857 are press fitted in the holding portion 806 and extend from a rear side 862 of the test field terminal holding portion 806 between the side edges 812 and 814. As is seen with respect to the pin portion 848 of the terminal 828, the pin portions 848-853 extend through slightly raised portions such as portion 863 which extends from the side 862.

Test field jumper wires 864-873 are coupled by wire wrapping techniques respectively to the pin portions 848-857 of the test field terminals 828-837. The test field wires 864-873 are then routed into the channel 91 near the edge 68 of the connector base 38 so that the test field wires 864-873 may be coupled respectively to the pin portions 349-340 of the outside plant terminals 339-330. In this manner, each of the test field terminals 810 is coupled to one of the outside plant terminals 46 so that the lines coupled to those outside plant terminals 46 may be tested. For instance, a test unit may be plugged into the recess 860 so as to make contact with the head 838 of the test field terminal 828 so as to test the outside plant line 381 connected to the outside plant terminal 339. Likewise, any central office lines coupled to the central office terminal 309 may be likewise tested when the connector module 365 is plugged into the socket group 364 because the module 365 interconnects the central office terminal 309 to the outside plant terminal 339 as heretofore described.

As is evident from FIGS. 13-17, the test field blocks 804 and 805 are conveniently mounted on the connector base 38 so that the personnel needing to test the telephone lines associated with the connector assembly 800 may readily make connections to the test field terminals 808 located in the test field terminal blocks 804 and 805. This is particularly the case since as was the case with the identification plate 58 used in connection with the connector assembly 30, the test field assembly 802 projects out from the front face of the main distribution frame system in a telephone central office when the connector assembly 800 is mounted on a framing member such as the member 32.

The test field blocks 804 and 805 also permit the central office cover 59 to be disposed about the central office terminals 44. With reference to FIG. 15, the leg 684 of the cover 59 fits between the ledges 70-90 and the sides 812 of the blocks 804 and 805. Consequently, even though the test field assembly 802 is utilized, the cover 59 may still be properly positioned.

Many times it is necessary and convenient to mount connector assemblies, such as the connector assembly 800, in vertical alignment along the vertical framing member 32 in the main distribution frame in a telephone central office. In order to maintain these connector assemblies in proper vertical alignment, an alignment clip 874, shown in FIGS. 18 and 19, may be used. In FIGS. 18 and 19 a portion of the connector assembly 800 is shown together with a portion of another identical connector assembly designated as connector assembly 800b. Those portions of connector 800b which are the same as corresponding portions of connector assembly 800 are designated by the same reference numeral followed by the letter "b".

The alignment clip 874 is made of an appropriate resilient insulating material that has a generally rectangular shaped body portion 876 having legs 878 and 880 at either end of the body portion 876. In order for the alignment clip 874 to maintain the connector assemblies 800 and 800b in proper vertical alignment, the leg 878 of the alignment clip 874 fits over a portion of the mounting end 818a of the connector assembly 800 and the leg 880 fits over a portion of the mounting end 816b of the connector assembly 800b. In this manner, the connector assemblies 800 and 800b are maintained in vertical alignment when mounted on the framing member 32 in the telephone central office main distribution frame system.

Referring now to FIGS. 20-22 of the drawings, therein is disclosed another alternate embodiment of the connector assembly of the present invention which is generally designated as connector assembly 900. Substantially all of the components of the connector assembly 900 are identical to the components in the connector assembly 30 so that the same reference numerals have been used to designate the components or parts of the connector assembly 900 which were used to designate the corresponding components or parts of the connector assembly 30. The connector assembly 900 illustrates an alternate method of connecting the conductive side 186 of the ground plate 182 to ground potential (FIGS. 20 and 22) and different types of covers for the channels 91-110 which eliminate the need of the central office cover 59 (FIGS. 21-22).

More specifically, in some instances it is preferable not to couple the conductive side 186 of the ground plate assembly 40 to ground potential through the mounting bracket assembly 50, but rather through a separate ground lead attached to the ground screw 56. In such instances, and as shown in FIGS. 20 and 22 of the drawings, an insulating washer 902 may be inserted between the ground screw 56 and the support structure 606 of the mounting bracket 50. Since the shank portion 614 of the ground screw 56 is smaller in diameter than the hole 612 in the supporting structure 606 through which the shank portion 614 extends, and thus does not make contact with the supporting structure 606, the provision of the insulating washer 902 between the mounting screw 56 and the support structure 606 will maintain the ground screw 56 isolated from the mounting bracket 50. A separate lead then can be coupled to the shank portion 614 of the ground screw 56 between the washer 902 and the screw 56 so that the lead may be coupled to ground potential. In this manner the conductive side 186 of the ground plate assembly 40 may be coupled to ground potential other than through the mounting bracket 50.

In this regard, FIG. 22 illustrates the fact that the face 64 of the connector base 38, both in the connector assembly 900 and the connector assembly 30, has a recess 904 into which the busbar 190 is disposed when the ground plate assembly 40 and particularly the conductive side 186 is positioned against the face 64. This enables the ground plate assembly 40 to fit flush against the face 64 even though the busbar 190 is raised slightly from the conductive side 186 of the ground plate 182.

As indicated with respect to the connector assembly 30 shown in FIGS. 1-12, trough covers 572-591 were provided to cover the channels 91-110. These covers 572-591 protected the connection of the lines 372-571 to the outside plant terminals 46. In addition, a separate central office cover 59 was provided to cover the central office terminals 44 and any connections made thereto. In the connector assembly 900 shown in FIGS. 21 and 22, trough covers 906 are provided to cover the channels 91-110 that are formed in the connector assembly 900. Each of the trough covers 906 are identical in configuration and, with specific reference to the trough cover 906, inserted between ledges 70 and 71 to cover the channel 91, has a covering support member 908 with leg members 910 and 912 extending therefrom. The leg members 910 and 912 fit about the ears 603 and 604 projecting from the ledges 70 and 71 so that the trough cover 906 can be snapped into position between the ledges 70 and 71. Moreover, the trough cover 906 has an upstanding projection or handle 914 extending from the cover portion 908. The upstanding projection 914 extends away from the cover portion 908 a distance greater than the central office terminals 44 extend from the ledges 71-90. In this manner, the trough covers 906 not only cover the channels 91-110 in the connector base 38, but at the same time provide some protection to the central office terminals 44 to insure that personnel working on connectors adjacent to the connector assembly 900 are not injured by the central office terminals 44. Moreover, the projection 914 acts as a handle so as to facilitate the mounting of the covers 906 over the channels 91-110 and eliminates the need for the central office cover 59.

Although the present invention is described with reference to several illustrative embodiments thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. A connector for telephone distributing equipment, said connector comprising:
    a generally elongated connector base having first and second opposed faces and first and second elongated edges,
    a ground plate means having opposed ground sides, one of said sides having conductive means, said ground plate means being adapted to be positioned against said second face of said connector base,
    pedestal means being adapted to be positioned agaist said ground plate means, and
    terminal means extending through said pedestal means, said ground plate means and said connector base to maintain said pedestal means against said ground plate means and to maintain said ground plate means against said second face of said connector base.

2. The connector as set forth in claim 1 wherein said terminal means includes first and second sets of terminals, said connector base includes first and second sets of base terminal holes, said ground plate means includes first and second sets of ground plate terminal holes and said pedestal means includes first and second sets of pedestal terminal holes, said first sets of terminals extend through said first sets of base terminal holes in said connector base, said first sets of ground plate terminal holes in said ground plate means and said first sets of pedestal terminal holes in said pedestal means and said second sets of terminals extend through said second sets of base terminal holes in said connector base, said second sets of ground plate terminal holes in said ground plate means and said second sets of pedestal terminal holes in said pedestal means.

3. The connector as set forth in claim 1 wherein said ground plate means has ground receptacle means connected to said conductive means and said pedestal means has ground receptacle holes into which said ground receptacle means is disposed.

4. The connector as set forth in claim 1 wherein said connector base has positioning means extending from said second face, said ground plate means has first positioning receiving means and said pedestal means has second positioning receiving means, said positioning means on said connector base being adapted to be inserted into said first and second positioning receiving means so as to properly align said connector base, said ground plate means and said pedestal means.

5. The connector as set forth in claim 2 wherein each of said terminals in said first sets of terminals has a first pin portion and a first receptacle portion, said first pin portions extending through said first sets of base terminal holes and ground plate terminal holes and said first receptacle portions being disposed in said first sets of pedestal terminal holes and wherein each of said terminals in said second sets of terminals has a second pin portion and a second receptacle portion, said second pin portions extending through said second sets of base terminal holes and ground plate terminal holes and said second receptacle portions being disposed in said second sets of receptacle terminal holes.

6. The connector as set forth in claim 1 wherein said pedestal means includes a plurality of pedestals, each of which has a first set of pedestal terminal holes and a second set of pedestal terminal holes, and has a plurality of projections extending through said ground plate means into said connector base and through which said first and second sets of terminal holes extend.

7. A connector for telephone distributing equipment comprising:
    a generally elongated connector base having first and second opposed faces and first and second elongated edges, said connector base having ledge means extending between said first and second elongated edges on said first face to form a plurality of rows of channels along said first face extending between said first and second elongated edges,
    a ground plate means having first and second ground sides, said first ground side being adapted to be positioned against said second face of said connector base,
    pedestal means being adapted to be positioned against said second ground side of said ground plate means,
    a first set of terminal means extending through said pedestal means, said ground plate means and said connector base including said ledges so as to extend from said ledges, and
    a second set of terminal means extending through said pedestal means, said ground plate means and said connector base into said channels on said first face of said connector base, said first and second terminal means maintaining said first ground side of said ground plate means against said second face of said connector base and maintaining said pedestal means against the second ground side of said ground plate means.

8. The connector as set forth in claim 7 wherein said connector base includes a fanning strip disposed along said first edge, said fanning strip having a projecting portion extending from said first face and a plurality of openings, each of said openings extending along said projecting portion from said first face and being adjacent one of said plurality of channels.

9. The connector as set forth in claim 8 including first telephone lines extending through at least one of said openings in said fanning strip into said channel adjacent said opening, said first telephone lines being coupled to said terminal means in said second set of terminal means extending into said channel.

10. The connector as set forth in claim 8 wherein each of said openings in said fanning strip is associated with one of said ledges and including second telephone lines extending through at least one of said openings in said fanning strip, said second telephone lines being coupled to said terminal means in said first set of terminal means extending from said ledge.

11. The connector as set forth in claim 7 wherein said connector base has positioning means extending from said second face so as to properly position said ground plate means and said pedestal means.

12. The connector as set forth in claim 7 including channel cover means disposed in at least some of said channels, said connector base including retaining means extending from said ledge means into said channels in order to maintain said channel cover means in said channels.

13. The connector as set forth in claim 12 wherein said channel cover means has a cover projecting portion extending away from said channel a distance greater than said terminal means in said first set of terminal means extend away from said ledge means.

14. The connector as set forth in claim 7 wherein said pedestal means includes a plurality of pedestals, each of which is associated with one of said channels and one of said ledge means.

15. The connector as set forth in claim 7 including projecting means extending from said second edge and indentification plate means being mounted on said projecting means along said second edge of said connector base.

16. The connector as set forth in claim 7 including projecting means extending from said second edge and test field means mounted on said projecting means along said second edge, said test field means including a third set of terminal means which are coupled to said second set of terminal means.

17. The connector as set forth in claim 16 including clip means adapted to be connected to said test field means to properly position said connector.

18. The connector as set forth in claim 15 including a fanning strip disposed along said first edge and having a projecting portion disposed a distance from said first face of said connector base, and including terminal cover means disposed between said projecting portion and said identification plate means so as to cover said first set of terminal means extending from said ledge means.

19. The connector as set forth in claim 16 including a fanning strip disposed along said first edge and having a projecting portion disposed a distance from said first face of said connector base, and including terminal cover means disposed between said projecting portion and said test field means so as to cover said first set of terminal means extending from said ledge means.

20. A connector for mounting a plurality of plug-in type protector modules in a telephone distribution frame system, said connector comprising:
a connector base,
a ground plate means disposed against said connector base,
pedestal means disposed against said ground plate means,
terminal means extending through said pedestal means, said ground plate means and said connector base to maintain said ground plate means between said connector base and said pedestal means, said terminal means having terminal receptacle portions disposed in said pedestal means, and
ground receptacle means extending from said ground plate means and into said pedestal means, said ground receptacle means and said terminal receptacle portions forming a plurality of socket groups in said pedestal means, each of which socket groups being capable of mounting one of said plug-in type protector modules on said pedestal means.

21. The connector as set forth in claim 20 wherein said connector base has first and second faces, said second face being disposed against said ground plate means and wherein said terminal means has terminal pin portions extending out from said first face of said connector base.

22. The connector as set forth in claim 21 wherein said connector base has first and second elongated edges between which said first and second faces extend, and mounting means secured to said connector base along said first edge, said mounting means mounting said connector to said framing system such that said first edge is adjacent said framing system and said first and second faces project away from said framing system.

23. A connector for telephone distributing equipment, said connector comprising:
a connector base having first and second faces extending between first and second elongated edges,
a ground plate having a first ground side disposed against said second face of said connector base and having a second ground side, said first ground side being of a conductive material and said second ground side being of an insulating material, and
pedestal means having first and second pedestal sides, said first pedestal side being disposed against said second ground side of said ground plate.

24. The connector as set forth in claim 23 including pedestal projection means extending from said first pedestal side through said ground plate into said connector base, and terminal means extending from said pedestal means in said pedestal projection means into said connector base, said pedestal projection means isolating said terminal means from said first ground side.

25. The connector as set forth in claim 24 including ground receptacle means coupled to said first ground side and extending from said second ground side into said pedestal means, and wherein said terminal means has terminal receptacle means disposed in said pedestal means, said ground receptacle means and said terminal receptacle means forming groups of receptacles accessible from said second side of said pedestal side.

26. The connector as set forth in claim 23 including a conductive strip on said first ground side of said ground plate and grounding means extending through said connector base and said ground plate and coupled to said conductive strip.

27. The connector as set forth in claim 26 including a recess in said second face of said connector base in which said conductive strip is disposed.

28. A connector for a telephone distributing system for connecting first telephone lines to second telephone lines, said connector comprising:
 a connector base having first and second faces extending between first and second elongated edges, said connector base having a plurality of ledge means extending from said first face between said first and second elongated edges so as to form rows of channel along said first face,
 a fanning strip disposed along said first edge of said connector base and having a projecting portion extending out from said first face of said connector base, said fanning strip having a plurality of openings extending in said projecting portion, each one of said openings being associated with one of said ledge means and one of said channels,
 first terminals disposed in each of said channels, at least one of said first terminals being coupled to at least one of said first telephone lines extended through said opening in said fanning strip associated with the channel in which said one first terminal is disposed, and
 second terminals extending from each of said ledge means, at least one of said second terminals being coupled to at least one of said second telephone lines extending through the opening associated with the ledge means from which said one second terminal extends.

29. A connector for a telephone distributing system for connecting first telephone lines to second telephone lines, said connector comprising:
 a connector base having first and second faces extending between first and second elongated edges, said connector base having a plurality of ledge means extending from said first face between said first and second elongated edges so as to form rows of channel means along said first face,
 a fanning strip disposed along said first edge of said connector base and having a projecting portion extending out from said first face of said connector base, said fanning strip having a plurality of openings extending in said projecting portion, each one of said openings being associated with one of said ledge means and one of said channels,
 first terminals disposed in each of said channels, at least one of said first terminals being coupled to at least one of said first telephone lines extended through said opening in said fanning strip associated with the channel in which said one first terminal is disposed,
 second terminals extending from each of said ledge means, at least one of said second terminals being coupled to at least one of said second telephone lines extending through the opening associated with the ledge means from which said one second terminal extends,
 retaining means extending from each of said ledge means into each of said channels, and
 channel cover means for covering said channels and the first terminals disposed therein, said channel cover means being retained in said channels by said retaining means.

30. The connector as set forth in claim 29 wherein said retaining means includes ears extending from said ledge means into said channels and said channel cover means having leg means adapted to be positioned about said ears.

31. A connector assembly to be mounted on a telephone frame member, said connector assembly comprising:
 a generally elongated connector base having first and second opposed faces extending between first and second elongated edges,
 terminal means projecting from said first face of said connector base,
 means for positioning a plurality of protector modules along said second face of said connector base,
 mounting means secured to said connector base along said first edge so as to mount said connector base on said frame member, said mounting means having first and second connecting means which can be positioned relative to said frame member such that said connector base may be rotated between first and second positions relative to said frame member to facilitate access to said terminal means.

32. A connector assembly to be mounted on a telephone frame member, said connector assembly comprising:
 a generally elongated connector base having first and second opposed faces extending between first and second elongated edges,
 terminal means projecting from said first face of said connector base, and
 mounting means secured to said connector base along said first edge so as to mount said connector base on said frame member, said mounting means having a support means secured to said connector base and having first and second connecting means to permit said connector base to be rotated between first and second positions relative to said frame member to facilitate access to said terminal means, said first connecting means projecting from said support means generally parallel to said support means and said second connecting means extending from said first connecting means at an angle such that when said first connecting means is positioned against said frame member said connector base is in said first position and when said second connecting means is against said frame member said connector base is in said second position.

33. The connector as set forth in claim 32 wherein said second connecting means extends from said first connecting means at an angle of approximately 30°.

34. The connector assembly as set forth in claim 32 including a hole extending through said first and second connecting means and fastening means to be inserted through said hole to secure said mounting means to said frame member, said connector base is in said first position when said fastening means is inserted through the portion of said hole in said first connecting means and in said second position when said fastening means is inserted through the portion of the hole in said second connecting means.

35. A connector assembly to be mounted on a telephone frame for the connection of telephone lines to telephone equipment, said connector assembly comprising:
 a connector base having first and second faces extending between first and second elongated edges,
 terminal means projecting from said first face of said connector base to which said telephone lines are connected, mounting means for mounting said connector base on said frame, said mounting means having generally U-shaped recesses with open ends thereof adjacent said frame such that said telephone lines are disposed in said recesses, and maintaining means detachably extending across said open end of said recesses to maintain said telephone lines in said recesses.

36. The connector assembly as set forth in claim 35 wherein said maintaining means includes clip means extending across the open end of said recesses to resiliently maintain said telephone lines in said recesses.

37. The connector assembly as set forth in claim 36 including protective means lining said recesses, said clip means forcing said telephone lines against said protective means.

38. A connector assembly for telephone distributing equipment including a frame member on which said connector assembly is mounted, said connector assembly comprising:

a connector base, a ground plate means disposed against said connector base, said ground plate means having conductive means, conductive mounting means for mounting said connector base on said frame member, and ground means extending through said mounting means and being coupled to said conductive means and said mounting means.

39. The connector assembly as set forth in claim 38 wherein said connector base has first and second faces and first and second elongated edges, said ground plate means has first and second ground sides with said conductive means disposed on said first ground side, said first ground side being disposed against said second face of said connector base, and including pedestal means disposed against said second ground side.

40. The connector assembly as set forth in claim 39 wherein said mounting means is disposed adjacent said pedestals on said second ground side and including ground adapter means disposed in said connector base and making contact with said conductive means, said ground means being inserted into said ground adapter means to connect said ground means to said conductive means.

41. The connector assembly as set forth in claim 39 including a plurality of ground receptacles extending from said second ground side of said ground plate means into said pedestal means, said ground receptacles being coupled to said conductive means.

42. A connector assembly for telephone distributing equipment including a frame member on which said connector assembly is mounted, said connector assembly comprising:

a connector base, a ground plate means disposed against said connector base, said ground plate means having conductive means, conductive mounting means for mounting said connector base on said frame member, ground means extending through said mounting means and being coupled to said conductive means, and isolating means to isolate said ground means from said mounting means.

43. The connector assembly as set forth in claim 42 wherein said connector base has first and second faces and first and second elongated edges, said ground plate means has first and second ground sides with said conductive means disposed on said first ground side, said first ground side being disposed against said second face of said connector base, and including pedestal means disposed against said second ground side.

44. The connector assembly as set forth in claim 43 wherein said mounting means is disposed adjacent said pedestals on said second ground side and including ground adapter means disposed in said connector base and making contact with said conductive means, said ground means being inserted into said ground adapter means to connect said ground means to said conductive means.

45. The connector assembly as set forth in claim 42 including a plurality of ground receptacles extending from said second ground side of said ground plate means into said pedestal means, said ground receptacles being coupled to said conductive means.

* * * * *